(12) United States Patent
Hoem et al.

(10) Patent No.: US 10,704,011 B2
(45) Date of Patent: Jul. 7, 2020

(54) LIPID EXTRACTION PROCESSES

(71) Applicant: AKER BIOMARINE ANTARCTIC AS, Stamsund (NO)

(72) Inventors: Nils Hoem, Oslo (NO); Asgeir Saebo, Eidsnes (NO)

(73) Assignee: AKER BIOMARINE ANTARCTIC AS, Stamsund (NO)

( * ) Notice: Subject to any disclaimer, the term of this patent is extended or adjusted under 35 U.S.C. 154(b) by 117 days.

(21) Appl. No.: 14/303,835

(22) Filed: Jun. 13, 2014

(65) Prior Publication Data

US 2014/0370115 A1 Dec. 18, 2014

Related U.S. Application Data

(60) Provisional application No. 61/834,965, filed on Jun. 14, 2013, provisional application No. 61/925,931, filed on Jan. 10, 2014.

(51) Int. Cl.
| | |
|---|---|
| *A61K 35/612* | (2015.01) |
| *C11B 1/10* | (2006.01) |
| *A23G 3/40* | (2006.01) |

(52) U.S. Cl.
CPC .............. *C11B 1/10* (2013.01); *A23G 3/40* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 2,652,235 A | 9/1953 | Samuelsen | |
| 4,036,993 A | 7/1977 | Ikeda | |
| 4,038,722 A | 8/1977 | Terase et al. | |
| 4,119,619 A | 10/1978 | Rogozhin et al. | |
| 4,133,077 A | 1/1979 | Jasniewicz | |
| 4,251,557 A | 2/1981 | Shimose et al. | |
| 4,505,936 A | 3/1985 | Meyers et al. | |
| 4,714,571 A | 12/1987 | Kearns et al. | |
| 4,749,522 A | 6/1988 | Kamarei | |
| 4,814,111 A | 3/1989 | Kearns et al. | |
| 5,006,281 A | 4/1991 | Rubin et al. | |
| 5,266,564 A | 11/1993 | Modolell | |
| 5,434,183 A | 7/1995 | Larsson-Backstrom | |
| 6,214,396 B1 | 4/2001 | Barrier | |
| 6,346,276 B1 | 2/2002 | Tanouchi et al. | |
| 6,537,787 B1 | 3/2003 | Breton | |
| 6,800,299 B1 | 10/2004 | Beaudoin | |
| 7,488,503 B1 | 2/2009 | Porzio et al. | |
| 7,666,447 B2 | 2/2010 | Rockway | |
| 8,030,348 B2 * | 10/2011 | Sampalis | A23J 7/00 514/506 |
| 8,057,825 B2 | 11/2011 | Sampalis | |
| 8,278,351 B2 | 10/2012 | Sampalis | |
| 8,372,812 B2 | 2/2013 | Tilseth et al. | |
| 8,383,675 B2 | 2/2013 | Sampalis | |
| 8,586,567 B2 * | 11/2013 | Sampalis | A61K 31/07 514/120 |
| 8,697,138 B2 | 4/2014 | Bruheim et al. | |
| 9,028,877 B2 | 5/2015 | Bruheim et al. | |
| 9,034,388 B2 | 5/2015 | Bruheim et al. | |
| 9,072,752 B1 | 7/2015 | Bruheim et al. | |
| 9,078,905 B2 | 7/2015 | Bruheim et al. | |
| 9,119,864 B2 | 9/2015 | Bruheim et al. | |
| 2002/0076468 A1 | 6/2002 | Saxby | |
| 2003/0044495 A1 | 3/2003 | Kagan | |
| 2003/0113432 A1 | 6/2003 | Yoshitomi | |
| 2004/0234587 A1 * | 11/2004 | Sampalis | A23J 7/00 424/450 |
| 2004/0241249 A1 | 12/2004 | Sampalis | |
| 2005/0003073 A1 | 1/2005 | Pivovarov et al. | |
| 2006/0078625 A1 | 4/2006 | Rockway | |
| 2006/0193962 A1 | 8/2006 | Kamiya et al. | |
| 2008/0166419 A1 | 7/2008 | Sones | |
| 2008/0166420 A1 | 7/2008 | Sones | |
| 2008/0274203 A1 * | 11/2008 | Bruheim | A61K 9/4858 424/522 |
| 2009/0061067 A1 | 3/2009 | Tilseth et al. | |
| 2010/0143571 A1 | 6/2010 | Breivik | |
| 2010/0160659 A1 | 6/2010 | Catchpole | |
| 2010/0226977 A1 | 9/2010 | Tilseth et al. | |
| 2011/0130458 A1 * | 6/2011 | Breivik | A23D 9/013 514/560 |
| 2011/0256216 A1 * | 10/2011 | Lefkowitz | A23D 9/007 424/451 |
| 2014/0005421 A1 | 1/2014 | Bruheim et al. | |
| 2014/0010888 A1 | 1/2014 | Bruheim et al. | |
| 2014/0080791 A1 | 3/2014 | Berge et al. | |
| 2014/0088043 A1 | 3/2014 | Hoem et al. | |
| 2014/0088047 A1 | 3/2014 | Hoem et al. | |
| 2014/0107072 A1 | 4/2014 | Tilseth et al. | |
| 2014/0274968 A1 | 9/2014 | Berge et al. | |
| 2014/0363517 A1 | 12/2014 | Bruheim et al. | |
| 2015/0030718 A1 | 1/2015 | Saebo | |
| 2015/0050403 A1 | 2/2015 | Tilseth et al. | |
| 2015/0164841 A1 | 6/2015 | Hoem et al. | |

FOREIGN PATENT DOCUMENTS

| | | |
|---|---|---|
| AU | 2002322233 | 2/2003 |
| BR | 8701265 | 3/1987 |

(Continued)

OTHER PUBLICATIONS

Revilla et al. (1998) J. Agric. Food Chem. 46, 4592-4597.*
Ierna et al. (2010) BMC Musculoskeletal Disorders 11: 136.*
Granois et al. (2009) J. Agric. Food Chem. 57, 6014-6020.*
Gigliotti et al. (2011) Food Chemistry, 125: 1028-1036.*
Gigliotti et al. (2011) Food Chemistry: 1028-1036.*
Raskin et al. (2004) Current Pharmaceutical Design, 10, 3419-3429.*
Winther et al. (2011) Lipids 46: 25-36.*

(Continued)

*Primary Examiner* — Terry A McKelvey
*Assistant Examiner* — Russell G Fiebig
(74) *Attorney, Agent, or Firm* — Casimir Jones S.C.; J. Mitchell Jones

(57) ABSTRACT

The present invention provides improved processes for extracting and preparing lipids from biological sources for use in pharmaceuticals, nutraceuticals and functional foods.

32 Claims, No Drawings

(56) References Cited

FOREIGN PATENT DOCUMENTS

| | | |
|---|---|---|
| CA | 1098900 | 4/1981 |
| CA | 2251265 | 4/2000 |
| CL | 40348 | 7/1997 |
| CN | 102746941 | 1/2014 |
| EP | 0609078 | 8/1994 |
| EP | 0670306 | 6/1995 |
| EP | 1127497 | 8/2001 |
| EP | 1392623 | 3/2004 |
| EP | 1406641 | 4/2004 |
| EP | 1631280 | 4/2004 |
| EP | 1542670 | 6/2005 |
| EP | 0973532 | 9/2005 |
| EP | 1689413 | 8/2006 |
| EP | 1660071 | 1/2007 |
| EP | 1743531 | 1/2007 |
| EP | 1123368 | 4/2008 |
| EP | 1419768 | 1/2009 |
| EP | 1292294 | 3/2009 |
| EP | 1706106 | 7/2009 |
| EP | 1385500 | 7/2010 |
| GB | 2097014 | 10/1982 |
| GB | 921537 | 6/1999 |
| JP | S51-125774 | 11/1976 |
| JP | S52-114046 | 9/1977 |
| JP | 60-153779 | 8/1985 |
| JP | 61281159 | 12/1986 |
| JP | S6323819 | 2/1988 |
| JP | 02049091 | 2/1990 |
| JP | 2215351 | 8/1990 |
| JP | 4012665 | 1/1992 |
| JP | 2963152 | 2/1992 |
| JP | 04057853 | 2/1992 |
| JP | 3081692 | 7/1994 |
| JP | 2524217 | 8/1996 |
| JP | H08-231391 | 8/1996 |
| JP | 3344887 | 7/1997 |
| JP | 3611222 | 8/1997 |
| JP | 2909508 | 6/1999 |
| JP | 2001-158736 | 6/2001 |
| JP | 2003-003192 | 1/2003 |
| JP | 2003-048831 | 2/2003 |
| JP | 2003-146883 | 5/2003 |
| JP | 3467794 | 9/2003 |
| JP | 2003-530448 | 10/2003 |
| JP | 3486778 | 10/2003 |
| JP | 2004-534800 | 11/2004 |
| JP | 3678317 | 5/2005 |
| JP | 2005-245379 | 9/2005 |
| JP | 2006-069948 | 3/2006 |
| JP | 2006-083136 | 3/2006 |
| JP | 2006-290784 | 10/2006 |
| JP | 2006-316073 | 11/2006 |
| JP | 2006-328014 | 12/2006 |
| JP | 2007-126455 | 5/2007 |
| JP | 2007-246404 | 9/2007 |
| SU | 220741 | 1/1971 |
| WO | 82/02819 | 9/1982 |
| WO | 1986/06082 | 10/1986 |
| WO | 89/01031 | 2/1989 |
| WO | 89/10960 | 11/1989 |
| WO | 1990/05765 | 5/1990 |
| WO | 1993/24142 | 12/1993 |
| WO | 97/38585 | 10/1997 |
| WO | 1997/38585 | 10/1997 |
| WO | 1997/39759 | 10/1997 |
| WO | 98/34498 | 8/1998 |
| WO | 1998/34498 | 8/1998 |
| WO | 99/39589 | 8/1999 |
| WO | 1999/39589 | 8/1999 |
| WO | 2000/23546 | 4/2000 |
| WO | 2000/25608 | 5/2000 |
| WO | 2000/38708 | 7/2000 |
| WO | 2001/028526 | 4/2001 |
| WO | 01/76385 | 10/2001 |
| WO | 2001/082928 | 11/2001 |
| WO | 2002/083122 | 10/2002 |
| WO | 2002-083122 | 10/2002 |
| WO | 2002/092540 | 11/2002 |
| WO | 02/102394 | 12/2002 |
| WO | 2002/102394 | 12/2002 |
| WO | 2003/011873 | 2/2003 |
| WO | 2003/013497 | 2/2003 |
| WO | 2004/028529 | 4/2004 |
| WO | 2004/047554 | 6/2004 |
| WO | 2004/112767 | 12/2004 |
| WO | 05/004593 | 1/2005 |
| WO | 2005-018632 | 3/2005 |
| WO | 2005/037848 | 4/2005 |
| WO | 2005/038037 | 4/2005 |
| WO | 2005/070411 | 8/2005 |
| WO | 2006/030552 | 3/2006 |
| WO | 2004-100943 | 5/2006 |
| WO | 06/111633 | 10/2006 |
| WO | 07/080515 | 7/2007 |
| WO | 2007/080514 | 7/2007 |
| WO | 2007/080515 | 7/2007 |
| WO | 2007/108702 | 9/2007 |
| WO | 07/123424 | 11/2007 |
| WO | 2008/006607 | 1/2008 |
| WO | 08/072563 | 6/2008 |
| WO | 08/117062 | 10/2008 |
| WO | 2008/117062 | 10/2008 |
| WO | 2009/027692 | 3/2009 |
| WO | 2010/097701 | 9/2010 |
| WO | 2011/050474 | 5/2011 |
| WO | 2012/139588 | 10/2012 |
| WO | 2013/102792 | 7/2013 |
| WO | 2014/013335 | 1/2014 |
| WO | 2015/104401 | 7/2015 |

OTHER PUBLICATIONS

International Search Report and Written Opinion, International Patent Application No. PCT/IB2014/002130, dated Feb. 3, 2015.
"Neptune krill Oil's Unique Properties", Internet Citation, 2011, URL:http://www.nowfoods.com/Products/ProductFAQs/081008/htm.
Gigliotti et al., "Extraction and characterisation of lipids from Antarctic krill (*Euphausia superba*)", Food Chemistry, 2011, vol. 125, No. 3, pp. 1028-1036.
Ali-Nehari et al., "Characterization of purified phospholipids from krill () residues deoiled by supercritical carbon dioxide", Korean Journal of Chemical Engineering, 2012, vol. 29, No. 7.
Ando and Hatano, 1988, "Isolation of apolipoproteins from carotenoid-carrying lipoprotein in the serum of chum salmon, *Oncorhynchus keta*", J. Lipid Research, 29: 1264-1271.
Aoi et al., 2003, "Astaxanthin limits exercise-induced skeletal and cardiac muscle damage in mice", Antioxidants & Redox Signaling, 5(1): 139-44.
Britton, 1985, "General Carotenoid Methods", Methods in Enzymology, vol. 111, pp. 113-149.
Calder, 2006, "n-3 polyunsaturated fatty acids, inflammation, and inflammatory diseases", Am. J. Clin. Nutr., 83: 1505S.
Charest et al., 2001, "Astaxanthin Extraction from Crawfish Shells by Supercritical CO2 with Ethanol as Cosolvent", J. Aquatic Food Product Technology, 10(3): 79-93.
Chen and Meyers, 1982, "Extraction of Astaxanthin Pigment from Crawfish Waste Using a Soy Oil Process", J. Food Sci., 47: 892-896.
Clarke, 1980, "The Biochemical Composition of Krill, *Euphausia superba dana*, from South Georgia", J. Exp. Mar. Biol. Ecol., 43: 221-236.
Czeczuga, 1974, "Comparative Studies of Carotenoids in the Fauna of the Gullmar Fjord (Bohuslan, Sweden). II. Crustacea: Eupagurus bernhardus, Hyas coarctatus and Upogebia deltaura", Marine Biology, 28: 95-98.
De Ritter and Purcell, 1981, "Carotenoid Analytical Methods", Carotenoids as Colorants and Vitamin A Precursors: Technological and Nutritional Applications, pp. 815-882.
Deutch, 1995, "Menstrual pain in Danish women correlated with low n-3 polyunsaturated fatty acid intake", Eur. J. Clin. Nut., 49(7): 508-16.

(56) References Cited

OTHER PUBLICATIONS

Diez et al., 2003, "The role of the novel adipocyte-derived hormone adiponectin in human disease", Eur. J. Endocrinol., 148(3): 293-300.
Ellingsen et al., 1987, "Biochemistry of the autolytic processes in Antarctic krill post mortem. Autoproteolysis." Biochem. J. 246, 295-305.
Emodi, 1978, "Carotenoids: Properties and Applications", Food Technology, 32(5): 38.
Felix-Valenzuela et al., 2001, "Supercritical $CO_2$/Ethanol Extraction of Astaxanthin from Blue Crab (*Callinectes Sapidus*) Shell Waste", Journal of Food Process Engineering, 24: 101-112.
Fox and Scheer, 1941, "Comparative Studies of the Pigments of Some Pacific Coast Echinoderms", The Biological Bulletin, 441-455.
Geusens et al., 1994, "Long-term effect of omega-3 fatty acid supplementation in active rheumatoid arthritis. A 12-month, double-blind, controlled study", Arthritis Rheum., 37(6): 824-9.
Gilchrist and Green, 1960, "The Pigments of Artemia", Proceedings of the Royal Society, Series B Biological Sciences, vol. 152 No. 946, pp. 118-136.
Goodwin and Srisukh, 1949, "Some Observations on Astaxanthin Distribution in Marine Crustacea", Department of Biochemistry, University of Liverpool, pp. 268-270.
Gulyaev and Bugrova, 1976 "Removing fats from the protein paste" Okean. Konservnaya I Ovoshchesushil'naya Promyshlennost, (4), 37-8.
Hardardottir and Kinsella, 1988, "Extraction of Lipid and Cholesterol from Fish Muscle with Supercritical Fluids" Journal of Food Science, 53(6): 1656-1658.
International Aqua Feed, 2006, vol. 9.
International Search Report and Written Opinion for PCT/GB2008/002934, dated Mar. 11, 2009.
International Search Report and Written Opinion for PCT/IB2010/000512; dated Jun. 24, 2010.
International Search Report for PCT/IB2007/000098, dated: Jun. 26, 2007.
Itoh et al., 2007; "Increased adiponectin secretion by highly purified eicosapentaenoic acid in rodent models of obesity and human obese subjects", Arteriosclerosis, Thrombosis, and Vascular Biology; 27(9): 1918-1925.
Johnson et al., 1978, "Simple Method for the Isolation of Astaxanthin from the Basidiomycetous Yeast *Phaffia rhodozyma*", Applied and Environmental Microbiology, 35(6): 1155-1159.
Kolakowska, 1989, "Krill lipids after frozen storage of about one year in relation to storage time before freezing", Die Nahrung Food, 33(3): 241-244.
Kris-Etherton et al., 2002, "Fish Consumption, Fish Oil, Omega-3 Fatty Acids, and Cardiovascular Disease", Circulation, 106:2747-2757.
Kristensen et al., 1989, "Dietary supplementation with n-3 polyunsaturated fatty acids and human platelet function: a review with particular emphasis on implications for cardiovascular disease", J. Intern. Med. Suppl. 731:141-50.
Kunesova et al., 2006, "The influence of n-3 polyunsaturated fatty acids and very low calorie diet during a short-term weight reducing regimen on weight loss and serum fatty acid composition in severely obese women", Physiol Res.; 55(1):63-72.
Laight et al., 1999, "F2-isoprostane evidence of oxidant stress in the insulin resistant, obese Zucker rat: effects of vitamin E", Eur. J. Pharmacol. 377(1): 89-92.
Lambertson and Braekkan, 1971, "Method of Analysis of Astaxanthin and its Occurrence in some Marine Products," J. Sci. Food. Agr., vol. 22(2): 99-101.
Libby et al., 2006, "Inflammation and Atherothrombosis: From Population Biology and Bench Research to Clinical Practice", J. Amer. Coll. Card., 48 (9, Suppl. A): A33-A46.
Lopez et al., 2004, "Selective extraction of astaxanthin from crustaceans by use of supercritical carbon dioxide", Talanta, 64: 726-731.

Mandeville, 1991, "Isolation and Identification of Carotenoid Pigments, Lipids and Flavor Active Components from Raw Commercial Shrimp Waste", Food Biotechnology, 5(2): 185-195.
Meyers and Bligh, 1981, "Characterization of Astaxanthin Pigments from Heat-Processed Crawfish Waste", J. Agric. Food Chem., 29: 505-508.
Meyers, 1977, "Using Crustacean Meals and Carotenoid-Fortified Diets", Feedstuffs, vol. 49(19).
Meyers, 1994, "Developments in world aquaculture, feed formulations, and role of carotenoids", Pure & Appl. Chem, vol. 66(5): 1069-1076.
Mills et al., 1989, "Dietary N-6 and N-3 fatty acids and salt-induced hypertension in the borderline hypertensive rat", Lipids, 24(1): 17-24.
Moates and Van Bentem, 1990, "Separating out the value", Food Science and Technology Today, 4(4): 213-214.
Nikolaeva, 1967 "Amino acid composition of protein-coagulate in krill", VNIRO, 63:161-4.
Phleger, et al. (2002) "Interannual and between species comparison in the lipids, fatty acids, and sterols of Antarctic krill from the US AMLR Elephant Island survey area: 1997 and 1998". Comp Biochem Physiol 131B:733-747.
Popp-Snijders et al., 1987, "Dietary supplementation of omega-3 polyunsaturated fatty acids improves insulin sensitivity in non-insulin-dependent diabetes", Diabetes Res. 4(3): 141-7.
Sachindra, 2006, "Recovery of carotenoids from shrimp waste in organic solvents", Waste Management, 26: 1092-1098.
Saether et al., 1986, "Lipids of North Atlantic krill", J Lipid Res., 27(3):274-85.
Shahidi et al., 1998, "Carotenoid Pigments in Seafoods and Aquaculture" Critical Reviews in Food Science, 38(1): 1-67.
Sidehu et al., 1970, "Biochmical Composition and Nutritive Value of Krill (*Euphausia superb dana*)", J. Sci Food Agr., vol. 21, 293-296.
Simopoulos, 1991, "Omega-3 fatty acids in health and disease and in growth and development", Am. Clin. Nutr. 54:438-63.
Somiya, 1982, "'Yellow lens' eyes of a stomiatoid deep-sea fish, *Malacosteus niger*", Proc. R. Soc. Lond., 215: 481-489.
Takahashi et al., Prediction of Relative Retention Value of the Individual Molecular Species of Diacyl Glycerolipid on High Performance Liquid Chromatography, Bull. Fac. Fish. Hokkaido Univ. 38(4), 398-404. 1987.
Tanaka, Biosynthesis of 1,2-dieicosapentaenoyl-sn-glycero-3-phosphocholine in Caenorhabditis elegans, Eur. J. Biochem. 263, 189±194 (1999).
Tocher, Chapter 6, Glycerophospholipid metabolism, Biochemistry and molecular biology of fishes, vol. 4, Hochachka and Mommsen (eds.)(1995).
Watanabe et al., Effective Components in Cuttlefish Meal and Raw Krill for Improvement of Quality of Red Seabream Pagrus major Eggs, Nippon Suisan Gakkaishi 57(4):681-694 (1991)("Watanabe").
WHO News and Activities, Bulletin of the World Health Organization, 73(4), pp. 547-51 (1995) ("WHO Bulletin").
Valeri, D., et al., "Visocities of Fatty acids, triglycerides and their binary mixtures," JAOCS 74 (1997) pp. 1221-1226.
CRC 2013-2014, 94th ed., pp. 6-231-6-235.
EP Opposition filed Feb. 13, 2014 by Olympic Seafood AS, EP Patent Application No. EP0871891016.
Brzustowicz, Michael R., et al., "Controlling Membrane Cholesterol Content. A Role for Polyunsaturated (Docosahexaenoate) Phospholipids," Biochemistry (2002), 41, pp. 12509-12519.
Jong-Ho Lee, "A Review: Antioxygenic and Peroxide-decomposing Activities of Antarctic Krill Lipids," J. Korean Soc. Food Mutr. 13(3) pp. 326-333 (1984).
Ki Woong Cho, et al., "Lipid and Fatty Acid Composition of the Antarctic Krill *Euphausia superba*," Ocean Research 21(2): 109-116 (1999).
Hvattum, Erlend, et al., "Effect of soybean oil and fish oil on individual molecular species of *Atlantic salmon* . . . ", Journal of Chromatography B, 748 (2000) 137-149.
Igarashi, Daisuke, et al., "Positional Distribution of DHA and EPA in Phosphatidylcholine and Phosphatidylethanolamine from Different Tissues of Squids," J. Oleo Sci. vol. 50, No. 9 (2001).

(56) References Cited

OTHER PUBLICATIONS

Tochizawa, Kaoru, et al., "Effects of Phospholipds Containing Docosahexaenoic Acid on Differentiation and Growth of HL-60 Human Promyelocytic Leukemia Cells," J. Jpn. Oil Chem. Soc. vol. 46, No. 4 (1997).
Zerouga, Mustapha, et al., "Comparison of phosphatidylcholines containing one or two docosahexaenoic acyl chains on properties of phospholipid monolayers and bilayers," Biochimica et Biophysica Acta 1236 (1995) 266-272.
Eung-Ho Lee, et al., "Studies on the Processing of Krill Sauce," J. Korean Soc. Food Nutr. 13(1) 97-106 (1984).
Hyun-Ku Kim, et al., "Effects of Cooking and Drying Methods on the Polar Lipds Composition of Shrimp," Korean J. Food Sci. Technol. vol. 21, No. 1, pp. 25-30 (1989).
Shon, Mi-Yae, et al., "Effects of Krill and Cadmium on Lipid Composition of Plasma in Cholesterol-Fed Rats," J. Korean Soc. Food Nutr. 23(1), 38-43 (1994).
Summons Materials downloaded from ESPACE on Dec. 16, 2014 for EP Patent Application No. 08 718 910.6.
Yanase, M., "Innovations on the russian method for separating heat coagulated protein from antarctic krill, through autolysis," Bulletin of Tokai Regional Fisheries Research Laboratory, 1974, No. 78, p. 79-84.
Kolakowski and Gajowiecki, "Optimization of autoproteolysis to obtain and edible product 'precipitate' from Antarctic krill," Seafood Science and Technology, pp. 331-336.
EP Opposition filed May 8, 2015 by Olympic Seafood AS, EP Patent No. 2144618, 150 pages.
Takaichi et al., 2003, "Fatty Acids of astaxanthin esters in krill determined by mild mass spectrometry", Comparative Biochemistry and Physiology Part B, Biochemistry and Molecular Biology, Elsevier, Oxford, vol. 136, Jan. 1, 2003, p. 317-322.
Tanaka et al., 2004, "Extraction of Phospholipids from Salmon Roe with Supercritical Carbon Dioxide and an Entrainer", J. Oleo Sci, 53(9): 417-424.
Tanaka et al., 2005, "Extraction of Phospholipids from Unused Natrual Resources with Supercritical Carbon Dioxide and an Entrainer", Journal of Oleo Science, vol. 54(11): 569-576.
Todoric et al., 2006, "Adipose tissue inflammation induced by high-fat diet in obese diabetic mice is prevented by n-3 polyunsaturated fatty acids", Diabetologia, 49(9): 2109-2119.
Tou et al., 2007, "Krill for human consumption: nutritional value and potential health benefits.", Nutrition Rev 65 (2):63-77.
Trayhurn et al., 2004, "Adipokines: inflammation and the pleiotropic role of white adipose tissue", Br. J. Nutrition, 92(3): 347-355.
Trebble et al., 2003, "Inhibition of tumour necrosis factor-alpha and interleukin 6 production by mononuclear cells following dietary fish-oil supplementation in healthy men and response to antioxidant co-supplementation", Br. J. Nutrition, 90(2): 405-412.
Ukkola et al., 2002, "Adiponectin: a link between excess adiposity and associated comorbidities?", J. Mol. Med., 80 (11): 696-702.
Van Der Veen et al., 1971 "The Lipids of Krill (*Euphausia* Species) and Red Crab (*Pleuroncodes planipes*)", Lipids, 6(7): 481-485.
Virtue, et al. 1996, Reproductive trade-off in male Antarctic krill, Euphausia superba, Marine Biology, vol. 126, No. 3, pp. 521-527.
Yamaguchi et al., 1983, "The Composition of Carotenoid Pigments in the Antarctic Krill *Euphausia superba*", Bulletin of the Japanese Society of Scientific Fisheries, 49(9): 1411-1415.
Yamaguchi et al., 1986, "Supercritical Carbon Dioxide Extraction of Oils From Antarctic Krill," Journal of Agricultural and Food Chemistry, vol. 34, pp. 904-907.
Yanase M; 1974, "Modification of a Russian method for separation of heat-coagulated protein from Antarctic krill", Database FSTA (online); International Food Information Service (IFIS); Frankfurt-Main, DE.
Yen et al., 1994, "Effect of dietary omega-3 and omega-6 fatty acid sources on PUVA-induced cutaneous toxicity and tumorogenesis in the hairless mouse", Arch. Dermatol. Res., 286(6): 331-6.
Database WPI Week 200682, Thomson Scientific, London, GB, 2006.

Yanase, M., "Modification of Russian Method for Separating Heat Congulated Protein from Antarctic Krill," Bull. Tokai Reg. Fish. Res. Lab, 78: 79-84 (1974).
Sikorski, E., "The Utilization of Krill for Food," Food Process Eng., 1:845-855 (1980).
Budzinskli, E., et al., "Possibilities of processing and marketing of products made from Antarctic Krill", FAO Fish. Tech. Pap. (268) 46 pages (1985) (Budzinski).
Bunea R., et al.., "Evaluation of the Effects of Neptune Krill Oil on the Clinical Course of Hyperlipidemia," Alternative Medicine Review, Thorne Research Inc., Sandpoint, US, vol. 9, No. 4, Jan. 1, 2004.
Gordeev, K.Y., et al. "Fatty Acid Composition of the Main Phospholipids of the Antarctic Krill, *Euphausia superba*," Khim. Prirod. Soed. 2 (1990), pp. 181-187.
Dec. 8, 2011 Office Action, KR Patent Application No. 10-2010-7006897 and its English translation.
JP Office Action dated Feb. 23, 2012, JP Patent Application No. 2010-522444 (and English translation).
CN Office Action dated Apr. 27, 2012, JP Patent Application No. 200880112125.6 (and English translation).
Fricke, et al., Lipid, Sterol and Fatty Acid Composition of Antarctic Krill (*Euphausia superba Dana*), Lipids (1984) 19(11): 821-827.
Fricke, et al., 1-O-Alkylglycerolipids in Antarctic Krill (*Euphausia Superba Dana*), Comp. Biochem. Physiol. (1986) 85B(1): 131-134.
Gordeev, K.Y., et al. "Fatty Acid Composition of the Main Phospholipids of the Antarctic Krill, *Euphausia superba*," Chem. Nat. Cmpds. (1990) 26(2), pp. 143-147.
Grantham (1977) Southern Ocean Fisheries Survey Programme, FAO Rome, GLO/SO/77/3: 1-61.
Raventos et al., Application and Posssibilities of Supercritical CO2 Extraction in Food Processing Industry: An Overview, Food Science and Technology International (2002) 8: 269-284.
Tanaka, T., et al., Platelet-activating Factor (PAF)-like Phospholoipds Formed during Peroxidation of Phosphatidylcholines from Different Foodstuffs, Biosci. Biotech. Biochem. (1995) 59 (8), pp. 1389-1393.
Winther, et al., Elucidation of Phosphatidylcholine Composition in Krill Oil Extracted from Euphausia superba, Lipids (2011) 46: 25-36.
"Neptune Technologies & Bioressources Soon to Obtain a Major Patent in Over 30 Countries" ("2001 Press Release,").
Action Closing Prosecution, '348 patent.
Apr. 2, 2012 Response to Office Action, '351 patent.
Balassa et al., Microencapsulation in the Food Industry, Critical Reviews in Food Technology, 2:2, 245-265 (1971) ("Balassa").
Bell and Dick, Molecular Species Composition of the Major Diacyl Glycerophospholipids from Muscle, Liver, Retina and Brain of Cod (*Gadus morhua*), Lipids, vol. 26, No. 8, pp. 565-573 (1991) ("Bell and Dick").
Bell, Molecular Species Analysis of Phosphoglycerides from the Ripe Roes of Cod, Lipids, vol. 24, No. 7 (1989).
Bell, Molecular Species Composition of Phosphatidylcholine from Crypthecodinium cohnii in Relation to Growth Temperature Lipids 25, 115-118 (1990).
Bergelson (ed.), Lipid Biochemical Preparations, Chapter 1.1, pp. 1-13 (1980).
Bottino N.R., "Lipid Composition of Two Species of Antarctic Krill: *Euphausia superba* and *E. crystallorophias*," Comp. Biochem. Physiol., 1975, vol. 50B, pp. 479-484.
Buchi R-220 Rotovapor® Manual.
Buda, Structural order of membranes and composition of phospholipids in fish brain cells during thermal acclimatization, Proc. Natl. Acad. Sci. USA vol. 91, pp. 8234-8238, Aug. 1994.
Certificate of translation of Ex. 1072: Fisheries Agency, General Report on Research and Development of Techniques in Processing and Utilization of Marine Products, Chapter 6, Development of technology for recovery of valuable substances (astaxanthin) from krill, by Takao Fujita, pp. 273-307 (Mar. 1985); Japanese language document.
Certificate of translation of Ex. 1074: Japanese Patent No. 60-153779, entitled "Nutritional Supplement".
Certificate of translation of Ex. 1076: Japanese Patent Publication No. H08-231391, entitled "Medicine for Improvement of Dementia Symptoms".

(56) References Cited

OTHER PUBLICATIONS

Certification of translation of Ex. 1070: Japanese Unexamined Patent Application Publication No. 02-215351.
Certified translation of Ex. 1070: Japanese Unexamined Patent Application Publication No. 02-215351, titled Krill Phospholipids Fractioning Method ("Maruyama,"); Certificate of Translation provided as Ex. 1071.
Certified translation of Ex. 1072: Fisheries Agency, General Report on Research and Development of Techniques in Processing and Utilization of Marine Products, Chapter 6, Development of technology for recovery of valuable substances (astaxanthin) from krill, by Takao Fujita, pp. 273-307 (Mar. 1985) ("Fujita") ; Certificate of Translation provided as Ex. 1073.
Certified translation of Ex. 1074: Japanese Patent No. 60-153779, entitled "Nutritional Supplement" ("Fukuoka "); Certificate of Translation provided as Ex. 1075.
Certified translation of Ex. 1076: Japanese Patent Publication No. H08-231391, entitled "Medicine for Improvement of Dementia Symptoms" ("Yasawa"); Certificate of Translation provided as Ex. 1077.
Declaration of Bjorn Ole Haugsgjerd in support of Inter Partes Review of U.S. Pat. No. 8,278,351.
Declaration of Bjorn Ole Haugsgjerd submitted during inter partes reexamination of parent U.S. Pat. No. 8,030,348 ("Haugsgjerd '348 Cel.").
Declaration of Dr. Albert Lee in Support of Inter Partes Review of U.S. Pat. No. 8,278,351 ("Lee").
Declaration of Dr. Albert Lee in Support of Inter Partes Review of U.S. Pat. No. 8,383,675 ("Lee").
Declaration of Dr. Chong Lee submitted during inter partes reexamination of parent U.S. Pat. No. 8,030,348 ("Yeboah Reexam Decl.").
Declaration of Dr. Earl White submitted during prosecution of parent patent U.S. Pat. No. 8,030,348 ("2011 White Decl.").
Declaration of Dr. Ivar Storrø in support of Inter Partes Review of U.S. Pat. No. 8,278,351 ("Storrø").
Declaration of Dr. Ivar Storrø in support of Inter Partes Review of U.S. Pat. No. 8,383,675 ("Storrø").
Declaration of Dr. Jacek Jaczynski from inter partes reexamination of the parent U.S. Pat. No. 8,030,348 ("Jaczynski Reexam Decl.").
Declaration of Dr. Jaczynski submitted during prosecution of parent U.S. Pat. No. 8,278,351 (Jaczynski '351 Decl.).
Declaration of Dr. Jeff Moore in Support of Inter Partes Review of U.S. Pat. No. 8,278,351 ("Moore").
Declaration of Dr. Jeff Moore in Support of Inter Partes Review of U.S. Pat. No. 8,383,675 ("Moore").
Declaration of Dr. Richard van Breemen in Support of Inter Partes Review of U.S. Pat. No. 8,278,351 ("Van Breemen").
Declaration of Dr. Richard van Breemen in Support of Inter Partes Review of U.S. Pat. No. 8,383,675 ("Van Breemen").
Declaration of Dr. Shahidi submitted during inter partes reexamination of parent U.S. Pat. No. 8,030,348 (Shahidi Reexam. Decl.).
Declaration of Dr. Shahidi submitted during prosecution of parent U.S. Pat. No. 8,278,351 (Shahidi '351 Decl.).
Declaration of Dr. Suzanne Budge in Support of Inter Partes Review of U.S. Pat. No. 8,278,351 ("Budge").
Declaration of Dr. Suzanne Budge in Support of Inter Partes Review of U.S. Pat. No. 8,383,675 ("Budge").
Declaration of Dr. Thomas Brenna in support of Inter Partes Review of U.S. Pat. No. 8,278,351.
Declaration of Dr. Thomas Brenna in support of Inter Partes Review of U.S. Pat. No. 8,383,675.
Declaration of Dr. Thomas Gundersen submitted during inter partes reexamination of parent U.S. Pat. No. 8,030,348 ("Gundersen Decl.").
Declaration of Dr. Tina Sampalis submitted during inter partes reexamination of parent U.S. Pat. No. 8,030,348 (Sampalis).
Declaration of Dr. Van Breemen submitted during Ex parte Reexamination of the '351 patent (Van Breemen '351 Reexam. Decl.
Declaration of Dr. Van Breemen submitted during Inter partes Reexamination of the '348 patent (Van Breemen '348 Reexam Decl.
Declaration of Dr. Yeboah submitted during inter partes reexamination of parent U.S. Pat. No. 8,030,348 ("Yeboah Reexam Decl.").
Declaration of Dr. Yeboah submitted during prosecution of parent U.S. Pat. No. 8,278,351 ("Yeboah '351 Decl.").
Eichberg, "Lecithin—It Manufacture and Use in the Fat and Oil Industry," Oils and Soap 51-54, 1939 ("Eichberg").
Expert Witness Report of Dr. Theodore Welch submitted in relation to ITC Investigation No. 337-TA-877 ("Welch").
Farkas, Composition and Physical State of Phospholipids in Calanoid Copepods from India and Norway, LIPIDS, vol. 23, No. 6 (1988).
Final Prospectus dated May 11, 2001 ("Final Prospectus").
Folch, et al., A Simple Method for the Isolation and Purification of Total Lipids from Animal Tissues. J. Biol. Chem., 226, 497-509 (1957).
Grant of Request for Ex parte Reexamination of the '351 patent.
Grit et al., Hydrolysis of phosphatidylcholine in aqueous liposome dispersions, Int. J. Pharmaceutics 50:1-6 (1989).
Henderson et al., Lipid Composition of the Pineal Organ from Rainbow Trout (*Oncorhynchus mykiss*), Lipids, vol. 29, No. 5, pp. 311-317 (1994) ("Henderson").
Herman and Groves, The Influence of Free Fatty Acid Formation on the pH of Phospholipid-Stabilized Triglyceride Emulsions, Pharmaceutical Research 10(5):774-776 (1993).
Itano Refrigerated Food Co., Ltd., Bio & High Technology Announcement and Natural Astaxanthin & Krill Lecithin, pp. 1-16 (on or before Dec. 28, 1994) ("Itano").
Johnson and Lucas, Comparison of Alternative Solvents for Oils Extraction, JAOCS 60(2):229-242 (1983).
Le Grandois et al., Investigation of Natural Phosphatidylholine Sources: Separation and Identification by Liquid Chromatography-Electrospray Ionization-Tandem Mass Spectrometry (LC-ESI-MS2) of Molecular Species, J. Agric. Food Chem., 57, 6014-20 (2009) ("Le Grandois").
Lin et al., Effect of Dietary N-3 Fatty Acids Upon the PhospholipidMolecular Species of the Monkey Retina, Invest Ophthalmol Vis Sci, 1994;35:794-803.
Medina et al., C Nuclear Magnetic Resonance Monitoring of Free Fatty Acid Release After Fish Thermal Processing, J. Amer. Oil Chem. Soc. 71(5):479-82 (1994).
Oct. 24, 2012 Office Action, '675 patent.
Office Action dated Jan. 5, 2012, '351 patent.
U.S. Appl. No. 60/307,842 (Priority document for the '351 patent).
Supplemental Declaration of Bjorn Ole Haugsgjerd submitted during inter partes reexamination of parent U.S. Pat. No. 8,030,348 ("Haugsgjerd '348 Supp. Decl.").
Supplemental Declaration of Dr. Earl White submitted during inter partes reexamination of parent U.S. Pat. No. 8,030,348 ("White Supp. Reexam. Decl.").
Supplemental Declaration of Dr. Earl White submitted during prosecution of parent U.S. Pat. No. 8,278,351 ("White Supp. Decl.").
Supplemental Declaration of Dr. Thomas Gundersen submitted during inter partes reexamination of parent U.S. Pat. No. 8,030,348 ("Gundersen Supp. Decl.").
Suzuki, T. and Shibata, N., "The utilization of Antarctic krill for human food," Food Rev. Int'l, 6:1, 119-147 (1990) ("Suzuki").
Takahashi et al., Compositional Changes in Molecular Species of Fish Muscle Phosphatidylcholine During Storage, Bull. Fac. Fish. Hokkaido Univ. 37(1), 80-84 1986.
Takahashi et al., Molecular Species of Fish Muscle Lecithin, Bulletin of the Japanese Society of Scientific Fisheries 48 (12), 1803-1814 (1982).
Allahpichay et al., "Extraction of Growth Promoting Fractions from Non-muscle Krill Meal of Euphausia superba and its Effect on Fish Growth," Bulletin of the Japanese Society of Scientific Fisheries, 1984, 50(5): 821-826.
International Search Report, International Patent Application No. PCT/IB2016/000208, dated May 13, 2016.
Database FSTA [Online} International Food Information Service, Frankfurt-Main; Shibata N. "Effect of fishing season on lipid

(56) References Cited

OTHER PUBLICATIONS content and composition of Antarctic krill (translated)" atabase accession No. FS-1985-04-r-0091, abstract only.
Statement of Grounds and Particulars, Rimfrost AS, filed Jun. 10, 2016, Australian Patent Application No. 2014203179, 22 pages.

* cited by examiner

LIPID EXTRACTION PROCESSES

CROSS REFERENCE TO RELATED APPLICATIONS

This application claims the benefit of U.S. Prov. Appl. 61/834,965 filed Jun. 14, 2013 and U.S. Prov. Appl. 61/925,931 filed Jan. 10, 2014, the entire contents of which are incorporated herein by reference.

FIELD OF THE INVENTION

The present invention provides improved processes for extracting and preparing lipids from biological sources for use in pharmaceuticals, nutraceuticals and functional foods.

BACKGROUND OF THE INVENTION

Accumulating evidence indicates that long chain omega-3 fatty acids found in fish, docosahexaenoic acid (DHA) and eicosapentaenoic acid (EPA), decrease the risk of CHD and ischemic heart disease. Large epidemiological studies, such as the Physicians' Health Study and the Nurses' Health Study, examined dietary and other lifestyle factors that influence health outcomes. The Physician's Health Study reported that consumption of one or more servings of fish per week was associated with a 52% lower risk of sudden cardiac disease compared to less than one fish meal per week. In another epidemiological study, the Nurses' Health Study in America, it was found that consumption of five or more servings of fish per week was associated with 45% fewer cardiac deaths compared to consumption of one fish meal per month. Long chain omega-3 fatty acids are known to be a protective dietary factor for cardiovascular disease. EPA and DHA have been shown to lower triglyceride levels and act as anti-arrhythmic agents. The American Heart Association (AHA) performed comprehensive reviews of the data for fish and fish oil consumption and cardiovascular disease. The AHA report recommends that individuals with and without heart disease and elevated blood triglyceride levels consume fish or take a fish oil supplement. A report prepared in 2003 by The Third Task Force of European and Other Societies also recommends fish oil as a standard therapy for post-myocardial infarction management.

The level of triglycerides in blood is positively associated with an increase in CHD, as triglyceride levels increase so does the risk of CHD. Multiple factors influence the elevation of serum triglycerides throughout life with a major contributor being the diet. Both DHA and EPA, which are abundant in many marine seafood products, appear to support cardiovascular health and lower blood triglyceride levels. It is known that fish oil can reduce serum triglyceride levels by 20-50%, similar to the effects observed with medications such as statins, niacin and fibrates. The American Heart Association recommends that individuals without documented CHD consume two servings of fish (preferably fatty fish) per week. Patients with CHD should consume 1 gram of EPA and DHA per day preferably from fatty fish or in a supplemental form (if under the care of a physician). For those patients who need to lower triglyceride levels, the American Heart Association recommends 2-4 grams of EPA and DHA per day in supplemental form under a physician's care. A prescription form of EPA and DHA, Lovaza (formerly known as Omacor), is a good omega-3 fatty acid source available for people with high levels of blood triglycerides. Each Lovaza 1 gram capsule contains 465 mg EPA ethyl ester, 375 mg DHA ethyl ester, 80 mg of other omega-3 fatty acids, 30 mg of omega-6 fatty acids and 50 mg of antioxidants. It is prescribed as an adjunct to diet to reduce very high triglyceride levels in adult patients.

In medical research, omega-3 fatty acids are being investigated to determine whether they can effectively improve a wide range of disease states-among them, heart disease, diabetes, inflammation, depression, Alzheimer's and attention deficit disorder—making this group of nutrients an exciting and very active area of clinical research. Ensuring that omega-3 fatty acids are a part of the diet as recommended by dietary guidelines is a proper starting point to achieving better health; hence, a great opportunity exists in the potential for improving the human condition with omega-3 fatty acids.

Oral administration of omega-3 compositions to some subjects results in unwanted side effects, including burping and reflux. The biological availability of some forms of omega-3 may also be limited. Accordingly, what is needed in the art are improved omega-3 formulations.

SUMMARY OF THE INVENTION

The present invention provides improved processes for extracting and preparing lipids from biological sources for use in pharmaceuticals, nutraceuticals and functional foods.

In some embodiments, the present invention provides processes for extracting a polar lipid-rich extract from a biological material comprising: contacting the biological material with a concentrated protic solvent under conditions such that polar lipids are preferentially extracted to form a slurry comprising a polar lipid solution and biological residue material; separating the polar lipid solution from the biological residue material to provide a separated polar lipid solution; adding an aqueous solution to the polar lipid solution to dilute the protic solvent so that the polar lipid solution separates into an upper phase comprising diluted protic solvent and a lower polar lipid-rich bottom phase; and isolating the polar lipid-rich bottom phase to provide the polar lipid-rich extract. In some embodiments, the adding an aqueous solution to the polar lipid solution to dilute the protic solvent that the polar lipid solution separates into an upper phase comprising diluted protic solvent and a lower polar lipid-rich bottom phase comprises adding the aqueous solution to dilute the concentration of the protic solvent to about 50% to 70% w/w when combined with the moisture in the biological sample, preferably about 55% to 65% w/w, and more preferably about 58% to 62% w/w. In some embodiments, the concentration of the protic solvent is diluted to about 60% w/w when combined with the moisture in the biological sample. In some embodiments, the contacting the biological material with a concentrated protic solvent under conditions such that polar lipids are preferentially extracted comprises mixing the biological material with a concentrated protic solvent at a temperature of from about −10 C to about 50 C so that the solvent concentration when combined with moisture in the biological material is from about 70% to about 95% w/w.

In some embodiments, the processes further comprise washing the polar-lipid rich extract with a diluted protic solvent in which polar lipids are poorly soluble to provide an upper phase comprising the diluted protic solvent and a polar lipid-rich bottom phase and isolating the bottom phase to provide a washed polar lipid-rich extract. In some embodiments, the washing is repeated from 2 to about 5 times. In some embodiments, wherein the washing the polar lipid-rich extract with a diluted protic solvent under conditions such that phospholipids are poorly soluble further comprises mixing the polar lipid-rich extract with the diluted protic solvent in a polar lipid-rich extract to diluted protic solvent ratio of from about 0.5:1 to 5:1, wherein the diluted protic solvent comprises an aqueous solution of about 30% to 70% of the protic solvent. In some embodiments, the protic solvent is selected from the group consisting of concentrated n-butanol, n-propanol, isopropanol, ethanol, and methanol. In some embodiments, the protic solvent is ethanol.

In some embodiments, the washed polar lipid-rich extract is characterized in comprising at least 50% phospholipid w/w. In some embodiments, the washed polar lipid-rich extract is characterized in comprising less than about 3% w/w lysophospholipids. In some embodiments, the washed polar lipid-rich extract is characterized in comprising less than about 1% w/w lysophospholipids. In some embodiments, the washed polar lipid-rich extract is characterized in comprising less than about 0.5% w/w lysophospholipids. In some embodiments, the washed polar lipid-rich extract is characterized in comprising less than about 0.1% lysophospholipids. In some embodiments, the washed polar lipid-rich extract is characterized in having a conductivity of less than 300 uS/cm measured in a saturated 60% ethanol solution. In some embodiments, the processes further comprise precipitating phospholipids from the washed polar-lipid rich extract. In some embodiments, the precipitating phospholipids from the washed polar-lipid rich extract further comprise mixing the washed polar-lipid rich extract with cold acetone under conditions such that phospholipids precipitate to provide a polar lipid-rich precipitate.

In some embodiments, the processes further comprise removing residual solvent from the polar lipid-rich extract or the washed polar lipid-rich extract by evaporation to provide a solid polar lipid-rich composition. In some embodiments, the solid polar lipid-rich composition comprises at least 90% phospholipids w/w. In some embodiments, the solid polar lipid-rich composition comprises less than about 3% lysophospholipids w/w. In some embodiments, the solid polar lipid-rich composition comprises less than about 1% lysophospholipids w/w.

In some embodiments, the process further comprise contacting the biological residue material with a protic solvent under conditions such that neutral lipids are extracted from the biological residue material to form a slurry comprising a neutral lipid solution and biological residue material; separating the neutral lipid solution from the biological residue material; and
evaporating the concentrated protic solvent from the neutral lipid solution to provide a neutral lipid extract. In some embodiments, the conditions such that neutral lipids are extracted from the biological residue material comprise mixing the biological residue material with the concentrated protic solvent in a ratio of about 2:1 to 8:1 at a temperature of from about 15 C to about 40 C.

In some embodiments, the processes further comprise combining the washed polar lipid-rich extract with the neutral lipid extract to provide a blended lipid composition. In some embodiments, the blended lipid composition is characterized in comprising less than about 3% lysophospholipids. In some embodiments, the blended lipid composition is characterized in comprising less than about 1% lysophospholipids. In some embodiments, the blended lipid composition is characterized in comprising less than about 0.5% lysophospholipids. In some embodiments, the blended lipid composition is characterized in comprising less than about 0.1% lysophospholipids.

In some embodiments, the biological material is selected from the group consisting of an algal material, a marine animal material and a plant material. In some embodiments, the marine animal material is selected from a fish material, a krill material, and a marine plankton material. In some embodiments, the krill material is selected from the group consisting of fresh krill, frozen krill, krill meal, wet krill paste, dried krill paste, and krill oil.

In some embodiments, the washed polar lipid-rich extract, the polar lipid-rich precipitate, the solid polar lipid-rich composition, the neutral lipid extract or the blended lipid composition produced as described above are formulated into an oral delivery vehicle. In some embodiments, the oral delivery vehicle is selected from the group consisting of a tablet, a capsule, and gel capsule, a solution, a suspension, an emulsion and a chewable matrix. In some embodiments, the washed polar lipid-rich extract, the polar lipid-rich precipitate, the solid polar lipid-rich composition, the neutral lipid extract or the blended lipid compositions produced as described above are formulated into an emulsion for parenteral or delivery.

In some embodiments, the present invention provides processes for making a gummi candy product comprising: blending a washed polar lipid-rich extract, polar lipid-rich precipitate, solid polar lipid-rich composition, or blended lipid composition produced as described above or a phospholipid composition as described above into a gel matrix to provide a blended gummi candy mix and forming a gummi candy from the blended gummi candy mix. In some embodiments, the present invention provides a product made by the foregoing processes.

In some embodiments, the present invention provides a composition or article comprising a washed polar lipid-rich extract, polar lipid-rich precipitate, solid polar lipid-rich composition, or blended lipid composition made as described above or a phospholipid composition as described above in a solid gel matrix.

In some embodiments, the present invention provides processes for extracting a lipid composition from a biological material comprising: contacting the biological material with a concentrated protic solvent under conditions such that polar lipids are preferentially extracted to form a slurry comprising a polar lipid solution and biological residue material; separating the polar lipid solution from the biological residue material; evaporating the protic solvent from the polar lipid solution to provide a polar lipid extract comprising phospholipids; washing the polar lipid extract with a diluted protic solvent under conditions such that phospholipids are poorly soluble; evaporating the second protic solvent to provide a washed phospholipid extract. In some embodiments, the contacting the biological material with a concentrated protic solvent under conditions such that polar lipids are preferentially extracted comprises mixing the biological material with a concentrated protic solvent at a temperature of from about −10 C to about 50 C so that the solvent concentration when combined with moisture in the biological material is from about 70% w/w to about 95% w/w. In some embodiments, the washing of the polar lipid extract with a second protic solvent under conditions such that phospholipids are poorly soluble comprising mixing the polar lipid extract with the diluted protic solvent in a polar lipid extract to diluted protic solvent ratio of from about 0.5:1 to 5:1, wherein the diluted protic solvent comprises an aqueous solution of about 30% w/w to 70% w/w of the protic solvent.

In some embodiments, the concentrated protic solvent is selected from the group consisting of concentrated n-butanol, n-propanol, isopropanol, ethanol, and methanol. In some embodiments, the diluted protic solvent is selected from the group consisting of diluted n-butanol, n-propanol, isopropanol, ethanol, and methanol. In some embodiments, the concentrated protic solvent is concentrated ethanol. In some embodiments, the diluted protic solvent is diluted ethanol.

In some embodiments, the washed phospholipid extract is characterized in comprising at least 50%, 60%, 70%, 80% or 90% phospholipid (i.e., weight of phospholipids/total weight of washed phospholipid extract). In some embodiments, the washed phospholipid extract is characterized in comprising less than about 3% lysophospholipids (i.e., weight of lysophospholipids/total weight of washed phospholipid extract). In some embodiments, the washed phospholipid extract is characterized in comprising less than about 1% lysophospholipids. In some embodiments, the washed phospholipid extract is characterized in comprising less than about 0.5% lysophospholipids. In some embodiments, the washed phospholipid extract is characterized in comprising less than about 0.1% lysophospholipids. In some embodiments, the washed phospholipid extract is characterized in having a conductivity of less than 300 uS/cm measured in a saturated 60% ethanol solution.

In some embodiments, the processes further comprise contacting the biological residue material with a concentrated protic solvent under conditions such that neutral lipids are extracted from the biological residue material to form a slurry comprising a neutral lipid solution and biological residue material; separating the neutral lipid solution from the biological residue material; and evaporating the concentrated protic solvent from the neutral lipid solution to provide a neutral lipid extract. In some embodiments, the conditions such that neutral lipids are extracted from the biological residue material comprise mixing the biological residue material with the concentrated protic solvent in a ratio of about 2:1 to 8:1 at a temperature of from about 15 C to about 40 C. In some embodiments, the processes further comprise combining the washed phospholipid extract with the neutral lipid extract to provide a blended lipid composition.

In some embodiments, the blended lipid composition is characterized in comprising less than about 3% lysophospholipids (i.e., weight of lysophospholipids/total weight of washed phospholipid extract). In some embodiments, the blended lipid composition is characterized in comprising less than about 1% lysophospholipids. In some embodiments, the blended lipid composition is characterized in comprising less than about 0.5% lysophospholipids. In some embodiments, the blended lipid composition is characterized in comprising less than about 0.1% lysophospholipids. In some embodiments, the washed phospholipid extract is characterized in having a conductivity of less than 300 uS/cm measured in a saturated 60% ethanol solution.

In some embodiments, the process further comprises the step of washing the phospholipids with cold acetone to recover a further concentrated phospholipid fraction. In some embodiments, the concentrated phospholipid fraction is at least 80%, 85%, 90% or 95% phospholipids w/w (i.e., weight of phospholipids/total weight of the concentrated phospholipid fraction).

In some embodiments, the biological material is selected from the group consisting of an algal material, a marine animal material and a plant material. In some embodiments, the marine animal material is selected from a fish material, a krill material, and a marine plankton material. In some embodiments, the krill material is selected from the group consisting of fresh krill, frozen krill, krill meal, wet krill paste, dried krill paste, and krill oil.

In some embodiments, the washed phospholipid extract, the neutral lipid extract or the blended lipid composition are formulated into an oral delivery vehicle. In some embodiments, the oral delivery vehicle is selected from the group consisting of a tablet, a capsule, and gel capsule, a solution, a suspension, an emulsion and a chewable matrix. In some embodiments, the washed phospholipid extract, the neutral lipid extract or the blended lipid composition are formulated into an emulsion for parenteral or delivery.

In some embodiments, the present invention provides a phospholipid composition comprising a mixture of phospholipid compounds having the following structure:

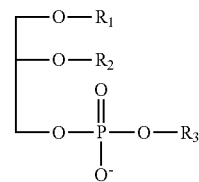

wherein R1 and R2 are selected from the group consisting of a fatty acid moiety and —H and R3 is H or selected from a choline, ethanolamine, inositol and serine moiety, the mixture of phospholipid compounds comprising more than about 85% or 90% choline moieties (i.e., mol %, moles of choline moieties/total moles of phospholipid compounds) at position R3 and more than about 30% w/w omega-3 fatty acid moieties (i.e., weight of omega-3 fatty acid moieties/total weight of phospholipid compounds), wherein more than about 90% w/w of the omega-3 fatty acid moieties (i.e., weight of omega-3 fatty acid moieties/total weight of fatty acid moieties) are at position R2, the composition further characterized in comprising less than about 3% w/w, preferably less than 1% w/w lysophospholipids (i.e., weight of lysophospholipids/total weight of phospholipid composition). In some embodiments, the compositions have a conductivity of less than about 300 uS/cm measured in a saturated 60% ethanol solution. In some embodiments, the omega-3 fatty acid moieties are selected from the group consisting of eicosapentaenoic acid, docosahexaenoic acid, and combinations thereof. In some embodiments, the composition comprises at least 50%, 60%, 70%, 75%, 80%, 90% or 95% w/w (i.e., weight of phospholipid compounds/total weight of phospholipid composition) of the phospholipid compounds. In some embodiments, the omega-3 moieties in the mixture of mixture of phospholipid compounds are eicosapentaenoic acid and the docosahexaenoic acid and wherein the eicosapentaenoic acid and the docosahexaenoic acid are present in a ratio of eicosapentaenoic acid:docosahexaenoic acid of from about 1:1 to about 3:1. In some embodiments, the composition further comprises at least 5% w/w and up to about 10%, 20%, 30%, 40%, or 50% w/w ethyl esters (i.e., weight of ethyl esters/total weight of composition) comprising omega-3 fatty acid moieties. In some embodiments, the composition comprises at least 10% w/w and up to about 20%, 30%, 40%, or 50% w/w glyceride compounds (i.e., weight of glyceride compounds/total weight of composition) comprising the omega-3 fatty acid moieties. In some embodiments, the composition comprises astaxanthin. In some embodiments, the composition comprises at least a second antioxidant. In some embodiments, the composition is partially or totally derived from krill.

In some embodiments, the composition is provided in a formulation selected from the group consisting of a capsule, a tablet, a liquid, a powder, an emulsion, a dietary supplement, a nutritional supplement, a beverage and a functional food.

In some embodiments, the compositions are used for oral or intravenous administration to a subject to reduce serum triglycerides, reduce serum cholesterol, reduce plaque formation, reduce platelet aggregation, treat atherosclerosis, improve cardiovascular health, reduce inflammation, reduce coronary heart disease, treat depression, treat Alzheimer's disease, treat attention deficit disorder, and treat metabolic syndrome. In some embodiments, the composition is administered in a daily dose of from about 0.1 to about 3 grams. In some embodiments, the composition is administered to a subject selected from the group consisting of humans, non-human primates, domestic raised or farmed animals, and companion animals.

In some embodiments, the present invention provides processes for making a gummi candy product comprising: blending a washed polar lipid-rich extract, polar lipid-rich precipitate, solid polar lipid-rich composition, or blended lipid composition made as above or a phospholipid composition as described above into a gel matrix to provide a blended gummi candy mix and forming a gummi candy from the blended gummi candy mix. In some embodiments, the present invention provides a product made the foregoing process.

In some embodiments, the present invention provides a composition comprising a washed polar lipid-rich extract, polar lipid-rich precipitate, solid polar lipid-rich composition, or blended lipid composition made as described above or a phospholipid composition as described above in a solid gel matrix.

Definitions

As used herein, "phospholipid" refers to an organic compound having the following general structure:

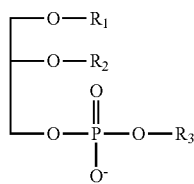

wherein R1 is a fatty acid moiety or —H, R2 is a fatty acid moiety or —H, and R3 is a —H or a phospholipid headgroup moiety such as a choline ($HOCH_2CH_2N^+(CH_3)_3OH^-$) moiety, ethanolamine ($HOCH_2CH_2NH_2$) moiety, serine moiety, or inositol moiety such as cyclohexane polyol inositol, or derivatives thereof. Preferably, R1 and R2 cannot simultaneously be —H. When R3 is an —H, the compound is a diacylglycerophosphate, while when R3 is a nitrogen-containing compound, the compound is a phosphatide such as lecithin, cephalin, phosphatidyl serine or plasmalogen.

As used herein, the term "long chain polyunsaturated fatty acid" refers to a fatty acid having 20 or more carbons and which is unsaturated at two or more bonds.

As used herein, the term omega-3 fatty acid refers to polyunsaturated fatty acids that have the final double bond in the hydrocarbon chain between the third and fourth carbon atoms from the methyl end of the molecule. Non-limiting examples of omega-3 fatty acids include, 5,8,11,14,17-eicosapentaenoic acid (EPA), 4,7,10,13,16,19-docosahexanoic acid (DHA) and 7,10,13,16,19-docosapentanoic acid (DPA).

As used herein, the term "moiety" when used in reference to a fatty acid refers to the portion of the fatty acid bound to another molecule via a bond, such as an ester or ether linkage to for example, a glyceride or phosphoglyceride molecule. The fatty acid "moiety" thus refers either to the aliphatic chain of a fatty acid, or to the fatty acyl group of a fatty acid. In the phospholipid structures defined herein, when the fatty acid moiety is a fatty acyl, the aliphatic chain of the fatty acyl is attached via an ester linkage and when the fatty acid moiety is an aliphatic chain of a fatty acid, the aliphatic chain is attached via an ether linkage. When a particular fatty acid is mentioned in connection with a phospholipid of the invention (e.g., EPA or DHA) it should therefore be taken as a reference to the relevant fatty acyl group or to its aliphatic chain.

As used herein, the term "physiologically acceptable carrier" refers to any carrier or excipient commonly used with oily pharmaceuticals. Such carriers or excipients include, but are not limited to, oils, starch, sucrose and lactose.

As used herein, the term "oral delivery vehicle" refers to any means of delivering a pharmaceutical orally, including, but not limited to, capsules, pills, tablets and syrups.

As used herein, the term "food product" refers to any food or feed suitable for consumption by humans, non-ruminant animals, or ruminant animals. The "food product" may be a prepared and packaged food (e.g., mayonnaise, salad dressing, bread, or cheese food) or an animal feed (e.g., extruded and pelleted animal feed or coarse mixed feed). "Prepared food product" means any pre-packaged food approved for human consumption.

As used herein, the term "foodstuff" refers to any substance fit for human or animal consumption.

As used herein, the term "functional food" refers to a food product to which a biologically active supplement has been added.

As used herein, the term "infant food" refers to a food product formulated for an infant such as formula.

As used herein, the term "elderly food" refers to a food product formulated for persons of advanced age.

As used herein, the term "pregnancy food" refers to a food product formulated for pregnant women.

As used herein, the term "nutritional supplement" refers to a food product formulated as a dietary or nutritional supplement to be used as part of a diet.

DETAILED DESCRIPTION OF THE INVENTION

The present invention provides improved processes for extracting and preparing lipids from biological sources for use in pharmaceuticals, nutraceuticals and functional foods.

In some preferred embodiments, the present invention provides multistage extraction processes designed to provide neutral and polar lipid extracts from a starting biological material. In some embodiments, the separate neutral and polar lipid extracts are subsequently combined to provide a lipid composition with a desired neutral and polar lipid content.

In some embodiments of the invention, lipids are extracted in a single step with a targeted concentration of the protic solvent, adjusted to the water content of the biological material. The ratio between the polar lipids and neutral lipids can be balanced or optimized by the polarity of the solvent.

The ratio of polar lipids can further be improved by a subsequent washing procedure with a protic solvent as described below. After the one step extraction and subsequent 3-5 washing steps, the polar lipid-rich extract will typically contain about 55-60% w/w phospholipids (i.e., weight of phospholipids/total weight of washed phospholipid extract) when made from a raw material where phospholipids comprises about 40% w/w of the lipids (i.e., weight of phospholipids/total weight of raw material). In other embodiments, a biological starting material is contacted with a stronger protic solvent to obtain a lipid extract highly enriched for phospholipids.

In preferred embodiments, the extractions are performed under conditions such that polar lipids are extracted into a liquid phase (i.e., a polar lipid solution) and neutral lipids preferentially remain associated with the biological material. Protic solvents include any solvents that have a hydrogen atom bound to an oxygen (as in a hydroxyl group) or a nitrogen (as in an amine group). In general terms, any solvent that contains labile $H^+$ is called a protic solvent. The molecules of such solvents readily donate protons ($H^+$) to reagents. In preferred embodiments, the protic solvent is an organic protic solvent. Suitable organic protic solvents include, but are not limited to, n-butanol, n-propanol, iso-propanol, nitromethane, ethanol, and methanol. In particularly preferred embodiments, the protic solvent is ethanol. In preferred embodiments, the biological starting material is extracted with protic solvent at a temperature of from about −10 C to about 50 C, preferably from about 10 C to 30 C. In preferred embodiments, the concentration of the protic solvent is at least than 90%, 95% or 98% w/w protic solvent (i.e., weight of protic solvent/total weight of diluted solvent solution) or is approximately 100% pure. In some embodiments, protic solvent is used at a ratio to the biological starting material of about 1:1 to 10:1, preferably about 3:1 to 7:1 and most preferably about 5:1. In some preferred embodiments, the protic solvent is added so that the protic solvent concentration when combined with moisture in said biological material is from about 70% to about 95%. This step yields a polar lipid solution that is enriched for polar lipids, especially phospholipids, and a biological residue that contains neutral lipids. The polar lipid solution and biological residue are preferably separated, for example by centrifugation or filtering or other suitable methods.

In some embodiments, an aqueous solution is added to the polar lipid solution to dilute the protic solvent. In preferred embodiments, dilution of the protic solvent results in the separation of the solution into an upper phase comprising diluted protic solvent and a lower polar lipid-rich bottom phase. In some embodiments, the concentration of the protic solvent is diluted to about 50% to 70% w/w (i.e., weight of protic solvent/total weight of diluted solvent solution), and preferably to about 60% w/w. In some embodiments, the polar lipid-rich bottom phase is isolated to provide a polar lipid-rich extract. The polar-lipid rich extract may then be subsequently washed or residual solvent and moisture may be removed, for example by evaporation.

In some embodiments, the polar lipid-rich extract is washed with a protic solvent solution, preferably comprising the same protic solvent used for the initial extraction step. The protic solvent is preferably used at a concentration in which polar lipids, especially phospholipids, are poorly soluble. In preferred embodiments, the washing step(s) provides an upper phase comprising the protic solvent solution and a polar lipid-rich bottom phase which when isolated provides a polar lipid-rich extract. In each washing step, the polar-lipid rich extract isolated from the previous step is remixed with fresh protic solvent solution and the polar-lipid rich extract is again preferably isolated. In preferred embodiments, the protic solvent solution used in the washing step comprises from about 30% to about 70% w/w protic solvent (i.e., weight of protic solvent/total weight of diluted solvent solution), preferably from about 40% to 60% w/w protic solvent, with the remainder of the solution being water or other suitable diluent for the protic solvent. In preferred embodiments, the washing step uses a polar lipid extract to diluted protic solvent ratio of from about 0.5:1 to 5:1. The washing step may be repeated a plurality times, for example, for at least 2 times, 3 times, four times, five times, or up to about 10 times and is preferably repeated from about 2 to 5 times. The washing process results in a washed polar-lipid rich extract.

In some embodiments, even more purified phospholipid concentrates are provided. These concentrates can be obtained by subjecting the polar lipid-rich extracts described in this invention to precipitation as in known in the art. In some embodiments, the precipitation step is performed with pure acetone at a temperature of from about −20 C to about +20 C, and more preferably at a temperature of about 4 C to provide a polar-lipid rich precipitate. In some embodiments, the precipitation step is repeated, for example from 2 to 5 times, and preferably about 3 times to provide a polar lipid-rich precipitate. By this technology, virtually the entire fraction of the remaining neutral lipids can be removed. In other embodiments, phospholipids may be concentrated by chromatography, for example, silica gel chromatography.

In some embodiments, residual solvent and moisture are preferably removed from the washed polar lipid-rich extract or polar-lipid rich precipitates by evaporation under reduced pressure to provide a solid polar lipid-rich composition.

In some embodiments, the washed polar lipid-rich extract is preferably characterized in comprising at least 50%, 60%, 70% or 75% phospholipid w/w (i.e., weight of phospholipids/total weight of washed polar-lipid rich extract). In some embodiments, the washed polar lipid rich extracts comprise from about 30% to 99% w/w, 40% to 60% w/w, or 50% to 70% w/w phospholipids. In some embodiments, the washed polar lipid-rich extract is characterized in comprising less than about 3%, 2%, 1%, 0.5% or 0.1% w/w lysophospholipids (i.e., weight of lysophospholipids/total weight of washed polar lipid-rich extract). In some embodiments, the washed polar lipid-rich extract is characterized in having a conductivity of less than 500 uS/cm, preferably less than 300 uS/cm, and most preferably less than 200 uS/cm (measured in a saturated 60% ethanol solution).

In some embodiments, the polar lipid-rich precipitate is preferably characterized in comprising at least 75%, 80%, 85% or 80% phospholipid w/w (i.e., weight of phospholipids/total weight of polar lipid-rich precipitate). In some embodiments, the washed polar lipid-rich extract is characterized in comprising less than about 3%, 2%, 1%, 0.5% or 0.1% w/w lysophospholipids (i.e., weight of lysophospholipids/total weight of polar lipid-rich precipitate).

The polar lipid-rich krill oil compositions obtained from the process are distinguished from naturally occurring krill oil. While the content of lysophospholipids is preferably low and the present invention provides improvements in lyso-phospholipid content as compared to available krill oils, the compositions in some embodiments, comprise a lower limit of lysophospholipids of greater than 0.01%, 0.05%, 0.1% or 0.2% w/w phospholipids (i.e., weight of lysophospholipids/total weight of polar lipid-rich precipitate). With respect to the lysophospholipid content, 2-lysophospholipids generally predominate. Free fatty acid indicates that the presence of C-14, C-16 and C-18 fatty acids and not EPA and DHA as would be expect following hydrolysis in the SN-2 position. It is contemplated that the degradation pathway is hydrolysis in the SN-1 position followed by in vitro trans-esterification resulting in 2-lysophospholipids. The polar lipid-rich krill oil compositions obtained from the processes of the present invention are also oxidized to some extent as demonstrated by the presence of low levels of polymerized phospholipids which are not found in nature as well as certain aldehydes.

The polar lipid-rich krill oil compositions obtained from the processes of the present invention also exhibit altered astaxanthin content. Astaxanthin is degraded as a result of oxidation and heating and during processing ratio of astaxanthin diesters to monoesters is shifted due to the aprotic solvent washes. The diester form predominates in vivo in krill. By measuring the ratio between absorption at 487 nm and 390 nm, the degree this shift in astaxanthin content can be determined. In some embodiments, the ratio of astaxanthin monester:astaxanthin diester is greater than about 2:1, 3:1, 4:1, 5:1 or 10:1. In other embodiments, the range of astaxanthin monester:astaxanthin diester ratios is preferably from about 2:1 to 100:1, 3:1 to 50:1, 4:1 to 20:1, 5:1 to 20:1 or 10:1 to 50:1. In some embodiments, the polar lipid-rich compositions comprise less than about 50, 40, 30, 20, 10 or 5 mg/kg (ppm) astaxanthin diesters. Use of aprotic solvents in the extraction and wash processes described herein can also lead to the production of fatty acids esters such as fatty acid ethyl esters, which are not found in vivo in krill. It is an advantage of the processes described herein that these fatty acid esters are generally removed to a very low level by the wash steps. Accordingly, in some embodiments, the compositions of the present invention comprise less than about 1.0%, 0.5%. 0.1%, 0.05% or 0.01% w/w fatty acid esters, preferably ethylesters (i.e., weight of ethyl- or other esters/total weight of polar lipid-rich composition). In some embodiments, the compositions have a lower limit of a trace amount of fatty acid esters (preferably ethyl esters) and in some embodiments, comprise more than about 0.001% or 0.005% fatty acid esters such as fatty acid ethyl esters.

In some embodiments, the polar-lipid rich compositions are preferably characterized in comprising at least 70%, 80%, 85%, 90%, or 95% phospholipid w/w (i.e., weight of phospholipids/total weight of solid polar-lipid rich composition). In some embodiments, the solid polar-lipid rich compositions are characterized in comprising less than about 3%, 2%, 1%, 0.5% or 0.1% w/w lysophospholipids (i.e., weight of lysophospholipids/total weight of solid polar-lipid rich composition).

In some embodiments, the washed polar lipid-rich extracts, polar lipid-rich precipitates, and solid polar lipid-rich compositions are further characterized in comprising a mixture of phospholipid compounds having the following structure:

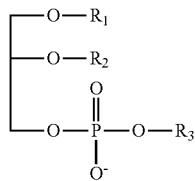

wherein R1 and R2 are selected from the group consisting of a fatty acid moiety and —H and R3 is H or selected from a choline, ethanolamine, inositol or serine moiety, the mixture of phospholipid compounds comprising more than about 85% or 90% choline moieties (i.e., mol %, moles of choline moieties/total moles of phospholipid compounds) at position R3 and more than about 30% w/w omega-3 fatty acid moieties (i.e., weight of omega-3 fatty acid moieties/weight of phospholipid compounds), wherein more than about 90% w/w of the omega-3 fatty acid moieties (i.e., weight of omega-3 fatty acid moieties/total weight of fatty acid moieties) are at position R2. In some embodiments, the compositions are characterized in comprising less than about 3%, 2%, 1%, 0.5% or 0.1% w/w lysophospholipids (i.e., weight of lysophospholipids/total weight of solid polar-lipid rich composition).

In some embodiments, the omega-3 fatty acid moieties are preferably selected from the group consisting of eicosapentaenoic acid, docosahexaenoic acid, and combinations thereof. In some embodiments, the omega-3 fatty acid moiety is selected from the group consisting of Eicosatrienoic acid (ETE; 20:3 (n-3); all-cis-11,14,17-eicosatrienoic acid); Eicosatetraenoic acid (ETA; 20:4 (n-3); all-cis-8,11,14,17-eicosatetraenoic acid); Eicosapentaenoic acid (EPA; 20:5 (n-3); all-cis-5,8,11,14,17-eicosapentaenoic acid); Heneicosapentaenoic acid (HPA; 21:5 (n-3); all-cis-6,9,12,15,18-heneicosapentaenoic acid); Docosapentaenoic acid (DPA; 22:5 (n-3); all-cis-7,10,13,16,19-docosapentaenoic acid; Docosahexaenoic acid (DHA; 22:6 (n-3); all-cis-4,7,10,13,16,19-docosahexaenoic acid); Tetracosapentaenoic acid (24:5 (n-3); all-cis-9,12,15,18,21-tetracosapentaenoic acid; and Tetracosahexaenoic acid (24:6 (n-3) all-cis-6,9,12,15,18,21-tetracosahexaenoic acid). In some embodiments, the omega-3 fatty acid moiety is bound through an ester bond at the R1 or R2 position (to provide an acylphospholipid), while in other embodiments, the omega-3 fatty acid moiety is bound through an ether bond or vinyl ether bond (to provide an ether phospholipid, alkylacylphospholipid, or alkenylacylphospholipid).

In some embodiments, the washed polar-lipid rich extracts comprise at least 50% w/w, 60% w/w, 75% w/w or 90% w/w of the phospholipid compounds, or from about 30% to 99%, 40% to 60%, or 50% to 70% of the phospholipid compounds (i.e., weight of phospholipid compounds/total weight of phospholipid composition). In some embodiments, the polar-lipid rich precipitates comprise at least 75% w/w, 80% w/w, 85% w/w or 90% w/w of the phospholipid compounds, or from about 60% to 99%, 70% to 95%, or 80% to 95% of the phospholipid compounds (i.e., weight of phospholipid compounds/total weight of polar lipid-rich precipitate). In some embodiments, the solid polar lipid-rich compositions comprise at least 80% w/w, 85% w/w, 90% or 95% w/w of the phospholipid compounds, or from about 60% to 99%, 80% to 99%, or 85% to 99% of the phospholipid compounds (i.e., weight of phospholipid compounds/total weight of solid polar lipid-rich composition).

In some embodiments, the omega-3 moieties in said mixture of mixture of phospholipid compounds are eicosapentaenoic acid and said docosahexaenoic acid and wherein said eicosapentaenoic acid and said docosahexaenoic acid are present in a ratio of eicosapentaenoic acid:docosahexaenoic acid of from about 1:1 to about 3:1. In some embodiments, the composition is partially or totally derived from krill.

In further embodiments, the fatty acid content of the extracts, precipitates and compositions is from about 1% to about 99% omega-3 fatty acid moieties on a weight/weight basis (w/w; calculated as the weight of omega-3 fatty acid moieties in the phospholipid fraction divided by the total weight of fatty acids in the phospholipid fraction) or molar ratio basis (moles of omega-3 fatty acid moieties in the composition expressed as a percentage of the moles total fatty acids), 10% to 40% omega-3 fatty acid moieties w/w or molar ratio, 20% to 40% omega-3 fatty acid moieties w/w or molar ratio, 20% to 50% omega-3 fatty acid moieties w/w or molar ratio, 40% to 60% omega-3 fatty acid moieties w/w or molar ratio, 40% to 99% omega-3 fatty acid moieties w/w or molar ratio, 60% to 99% omega-3 fatty acid moieties w/w or molar ratio, or 80% to 99% omega-3 fatty acid w/w or molar ratio. The w/w % may preferably be determined by an analytical method selected from the group consisting of gas chromatography (GC), high performance liquid chromatography (HPLC), GC-mass spectrometry (GC-MS), nuclear magnetic resonance (NMR) or other suitable methods as is known in the art. In some preferred embodiments, the omega-3 fatty acid moieties are preferably selected from DHA, EPA and combinations thereof. In some embodiments, more than 90% w/w of the omega-3 fatty acid moieties, preferably more than 95% w/w of the omega-3 fatty acid moieties, and most preferably more than about 98% w/w of the omega-3 fatty acid moieties are distributed at the R2 position. In some preferred embodiments, the omega-3 fatty acid moieties are greater than 50%, 60%, 70%, 80%, 90% or 95% w/w EPA and/or DHA (i.e., weight of EPA and/or DHA total weight of omega-3 fatty acid moieties). In some embodiments, the ratio of EPA to DPA is from about 10:1 to 1:10, 3:1 to 1:3, 5:1 to 1:1, 3:1 to 1:1, 2:1 to 1:1, 1:1 to 1:3, or 1:1 to 1:5 on a molar basis. In some embodiments, the extracts and compositions comprise greater than about 40%, 50%, 60%, 70%, 80%, 90% or 95% phospholipid compounds w/w (i.e., weight of phospholipid compounds/total weight of phospholipid composition).

In some embodiments, the biological residue from the initial extraction step is extracted to provide a neutral lipid extract. This extraction step preferably uses a protic solvent, most preferably the same protic solvent used in the initial extraction step. In preferred embodiments, the biological residue is extracted with protic solvent at a temperature of from about 15 C to about 40 C, preferably from about 20 C to about 30 C. In preferred embodiments, the concentration of the protic solvent is at least than 90%, 95% or 98% w/w protic solvent (i.e., volume of protic solvent/total volume of diluted solvent) or is approximately 100% pure. In some embodiments, protic solvent is used at a ratio to the biological starting material of about 1:1 to 10:1, preferably about 3:1 to 7:1 and most preferably about 5:1. This step yields a neutral lipid extract that is enriched for neutral lipids and lipophilic substances such as astaxanthin and vitamin E, if present in the biological starting material.

In some embodiments, the neutral lipid extract preferably comprises a mixture of triacylglycerols, diacylglycerols and free fatty acids. In a phospholipid concentrate comprising about 60% phospholipids by weight (i.e., weight of phospholipids/total weight of concentrate), the neutral phase preferably comprises about 70-80% triacyglycerols w/w (i.e., weight of triacylglycerols/total weight of concentrate), about 10-15% free fatty acids w/w (i.e., weight of free fatty acids/total weight of concentrate), about 2-5% diacylglycerols w/w (i.e., weight of diacylglycerols/total weight of concentrate) and about 1-2% w/w minor constituents (i.e., weight of minor constituents/total weight of concentrate) such as cholesterol and astaxanthin. In a phospholipid concentrate comprising above about 80-90% w/w phospholipids (i.e., weight of phospholipids/total weight of concentrate) obtained from extraction of a coagulum of krill, the neutral phase preferably comprises about 70-80% w/w diacylglycerols (i.e., weight of diacylglycerols/total weight of concentrate), about 10-25% w/w triacylglycerols (i.e., weight of triacylglycerols/total weight of concentrate) and about 3-6% w/w free fatty acids (i.e., weight of free fatty acids/total weight of concentrate).

The washed polar lipid-rich extracts, polar lipid-rich precipitates, solid polar lipid-rich compositions and neutral lipid extracts may be used as is or combined to provide a blended lipid composition with a desired polar lipid and neutral content. In preferred embodiments, the blended lipid composition has a defined phospholipid and triglyceride content. In some preferred embodiments, the blended lipid compositions have a phospholipid content of from about 30% to 60% w/w, 35% to 50% w/w, or 36% to 44% w/w (i.e., weight of phospholipids/total weight of blended lipid composition), and a triglyceride content of from about 40% to 70% w/w, 50% to 65% w/w, or 56% to 64% w/w (i.e., total weight of triglycerides/total weight of blended lipid composition). In some embodiments, the blended lipid compositions comprise astaxanthin, preferably natural astaxanthin provided from the neutral lipid extract. In some embodiments, the lipid compositions provide at least a second antioxidant such as vitamin E. In some embodiments, the lipid composition may be supplemented with an additional omega-3 fatty acid derivative, such as EPA or DHA ethyl esters, preferably EPA and/or DHA ethyl ester concentrates, or triglycerides or diglycerides comprising EPA and DHA residues. In these embodiments, the additional omega-3 fatty acid derivatives are added to provide a desired omega-3 fatty acid content in the lipid composition.

The present invention is not limited to the use of any particular biological starting material. The biological starting material may preferably be or be produced from an algal biomass, plant biomass or marine animal biomass. In preferred embodiments, marine animal biomasses are utilized as the starting material. Suitable marine animal biomasses include, but are not limited to, krill, crabs, Calanus, plankton, eggs, crayfish, shrimp, fish, especially herring, and marine algaes. The biological starting material can be either fresh or frozen, or can be a material produced from an algal, plant or marine animal biomass such as a meal, powder, hydrolysate, or coagulate (paste). The paste may be a wet paste or a dried paste. In some preferred embodiments, the biological starting material is a krill material, for example a krill coagulate, krill meal, krill hydrolysate, or fresh or frozen krill. Any species of krill may be utilized. In preferred embodiments, the krill is *Euphausia superba* or *Euphausia pacifica*.

In some particularly preferred embodiments, the biological starting material is a krill paste or coagulate and may be wet or dried. Suitable krill pastes are described, for example, in WO 09/027,692, which is incorporated herein by reference in its entirety. In some embodiments, the biomass (preferably krill, freshly harvested or frozen) is heated to a temperature in the range of 25 to 80° C., preferably 40 to 75° C., and most preferably 60 to 75° C. in order to dissolve/disperse lipids and proteins from the krill into the water phase. In some embodiments, the proteins and phospholipids are precipitated out of the water phase by heating the water (after removal of the krill) to a temperature of greater than about 80° C., preferably 80 to 120° C., most preferably 95 to 100° C. The water phase may be heated at atmospheric pressure, or the water phase may be heated in a closed system at an elevated pressure so that the temperature can be increased above 100° C. The precipitate formed (hereafter called a coagulum) can be isolated and characterized. In other embodiments, the water phase is microfiltrated. The solid phase produced by microfiltration (called the retentate)

is similar to that of the coagulum. Data disclosed show that much of the phospholipid in the krill is transferred from the krill to the coagulum or retentate.

The krill paste compositions are characterized by being a protein-lipid mixture. In preferred embodiments, the compositions comprise from about 10% to about 30% phospholipids on a dry w/w basis, and about 20% to 50% protein on a dry w/w basis, wherein the phospholipids comprise omega-3 fatty acid residues. In some embodiments, the compositions comprise a lipid fraction having an omega-3 fatty acid content of from about 10% to about 25% on a dry w/w basis. In some embodiments, the phospholipids comprise greater than about 90% phosphatidylcholine on a dry w/w basis. In some embodiments, the phospholipids comprise less than about 10% ethanolamine on a dry w/w basis. In some embodiments, the paste compositions comprise from about 20% to about 45% triacylglycerol on a dry w/w basis. In some embodiments, the compositions comprise less than about 1% w/w cholesterol (i.e., weight of cholesterol/total weight of krill paste). In some embodiments, the compositions comprise from about 0.01 to about 200 mg/kg naturally-occurring astaxanthin. It will be recognized that the astaxanthin content of the composition can be increased by adding in astaxanthin from other (exogenous) sources, both natural and non-natural. Likewise, the compositions can be supplemented with exogenous triglycerides, phospholipids and fatty acids such as omega-3 fatty acids during processing. In some preferred embodiments, the krill paste is a wet krill paste, comprising water in a concentration from about 50% to 80%, 60% to 70% or about 65% w/w (i.e., weight of water/total weight or krill paste).

In some embodiments, the present invention provides compositions comprising the polar lipid-rich extracts, blended lipid compositions or concentrates described above and one or more additional omega-3 fatty acid derivatives or free fatty acids. The omega-3 fatty acid derivatives or free fatty acids may be derived from the neutral lipid extract or from an additional source, such as fish oil or omega-3 ester concentrate. In some embodiments, the one or more additional omega-3 fatty acid derivatives are selected from omega-3 esters and glycerides. For example, in some embodiments, the composition may comprise from about 1% to about 60% w/w phospholipids (i.e., weight of phospholipid compounds/total weight of composition), with the remaining 99% to 40% w/w of the composition being omega-3 glycerides, esters, or free fatty acids or a combination thereof (i.e., weight of omega-3 glycerides, esters, or free fatty acids or a combination thereof/total weight of the composition). In some embodiments, the composition may comprise from about 5% to about 60% w/w phospholipids, with the remaining 95% to 40% w/w of the composition being omega-3 glycerides, esters, or free fatty acids or a combination thereof. In some embodiments, the composition may comprise from about 20% to about 60% w/w phospholipids, with the remaining 80% to 40% w/w of the composition being omega-3 glycerides, esters, or free fatty acids or a combination thereof. In some embodiments, the composition may comprise from about 30% to about 60% w/w phospholipids, with the remaining 70% to 40% w/w of the composition being omega-3 glycerides, esters, or free fatty acids or a combination thereof. In some embodiments, the composition may comprise from about 40% to about 60% w/w phospholipids, with the remaining 60% to 40% w/w of the composition being omega-3 glycerides, esters, or free fatty acids or a combination thereof. In some embodiments, the composition may comprise from about 50% to about 60% w/w phospholipids, with the remaining 50% to 40% w/w of the composition being omega-3 glycerides, esters, or free fatty acids or a combination thereof.

In some embodiments, the compounds or compositions described above are administered to a subject in need thereof to treat a disease or condition associated with red blood cells and cell membranes, and in particular a disease or conditions associated with an abnormality in red blood cells of cell membranes. In some embodiments, the condition or disease is sickle cell disease, sickle cell anemia, or sickle cell trait. In some embodiments, the condition or disease is thalassemia (alpha-, beta- or delta-), thalassemia in combination with a hemoglobinopathy (Hemoglobin E, Hemoglobin S, or Hemoglobin C), splenomegaly, or membrane abnormities such as acanthocytes or spur/spike cells, codocytes (target cells), echinocytes (burr cells), elliptocytes and ovalocytes, spherocytes, stomatocytes (mouth cells) and degmacytes ("bite cells").

In some embodiments, an effective amount of the compounds or compositions described above are administered to a subject in need thereof to treat or prevent a cardiovascular disorder or metabolic syndrome. In some embodiments, the cardiovascular disorder is selected from atherosclerosis, arteriosclerosis, coronary heart (carotid artery) disease (CHD or CAD), acute coronary syndrome (or ACS), valvular heart disease, aortic and mitral valve disorders, arrhythmia/atrial fibrillation, cardiomyopathy and heart failure, angina pectoris, acute myocardial infarction (or AMI), hypertension, orthostatic hypotension, shock, embolism (pulmonary and venous), endocarditis, diseases of arteries, the aorta and its branches, disorders of the peripheral vascular system (peripheral arterial disease or PAD), Kawasaki disease, congenital heart disease (cardiovascular defects) and stroke (cerebrovascular disease), dyslipidemia, hypertriglyceridemia, hypertension, heart failure, cardiac arrhythmias, low HDL levels, high LDL levels, stable angina, coronary heart disease, acute myocardial infarction, secondary prevention of myocardial infarction, cardiomyopathy, endocarditis, type 2 diabetes, insulin resistance, impaired glucose tolerance, hypercholesterolemia, stroke, hyperlipidemia, hyperlipoproteinemia, chronic kidney disease, intermittent claudication, hyperphosphatemia, omega-3 deficiency, phospholipid deficiency, carotid atherosclerosis, peripheral arterial disease, diabetic nephropathy, hypercholesterolemia in HIV infection, acute coronary syndrome (ACS), non-alcoholic fatty liver disease/non-alcoholic steatohepatitis (NAFLD/NASH), arterial occlusive diseases, cerebral atherosclerosis, arteriosclerosis, cerebrovascular disorders, myocardial ischemia, coagulopathies leading to thrombus formation in a vessel and diabetic autonomic neuropathy.

In some embodiments, an effective amount of the compounds or compositions described above are administered to a subject in need thereof to treat, prevent, or improve cognition and/or a cognitive disease, disorder or impairment (memory, concentration, learning (deficit)), or to treat or prevent neurodegenerative disorders. In some embodiments, the cognitive disease, disorder or impairment is selected from Attention Deficit Disorder (ADD), Attention Deficit Hyperactivity Disorder (ADHD), autism/autism spectrum disorder (ASD), (dyslexia, age-associated memory impairment and learning disorders, amnesia, mild cognitive impairment, cognitively impaired non-demented, pre-Alzheimer's disease, Alzheimer's disease, epilepsy, Pick's disease, Huntington's disease, Parkinson disease, Lou Gehrig's disease, pre-dementia syndrome, Lewy body dementia dementia, dentatorubropallidoluysian atrophy, Freidreich's ataxia, multiple system atrophy, types 1, 2, 3, 6, 7 spinocerebellar ataxia, amyotrophic lateral sclerosis, familial spastic paraparesis, spinal muscular atrophy, spinal and bulbar muscular atrophy, age-related cognitive decline, cognitive deterioration, moderate mental impairment, mental deterioration as a result of ageing, conditions that influence the intensity of brain waves and/or brain glucose utilization, stress, anxiety, concentration and attention impairment, mood deterioration, general cognitive and mental well being, neurodevelopmental, neurodegenerative disorders, hormonal disorders, neurological imbalance or any combinations thereof. In a specific embodiment, the cognitive disorder is memory impairment.

In some embodiments, an effective amount of the compounds or compositions described above are administered to a subject in need thereof to inhibit, prevent, or treat inflammation or an inflammatory disease. In some embodiments, the inflammation or inflammatory disease is selected from organ transplant rejection; reoxygenation injury resulting from organ transplantation (see Grupp et al., J. Mol. Cell. Cardiol. 31: 297-303 (1999)) including, but not limited to, transplantation of the following organs: heart, lung, liver and kidney; chronic inflammatory diseases of the joints, including arthritis, rheumatoid arthritis, osteoarthritis and bone diseases associated with increased bone resorption; inflammatory bowel diseases (IBD) such as ileitis, ulcerative colitis (UC), Barrett's syndrome, and Crohn's disease (CD); inflammatory lung diseases such as asthma, acute respiratory distress syndrome (ARDS), and chronic obstructive pulmonary disease (COPD); inflammatory diseases of the eye including corneal dystrophy, trachoma, onchocerciasis, uveitis, sympathetic ophthalmitis and endophthalmitis; chronic inflammatory diseases of the gum, including gingivitis and periodontitis; inflammatory diseases of the kidney including uremic complications, glomerulonephritis and nephrosis; inflammatory diseases of the skin including sclerodermatitis, psoriasis and eczema; inflammatory diseases of the central nervous system, including chronic demyelinating diseases of the nervous system, multiple sclerosis, AIDS-related neurodegeneration and Alzheimer's disease, infectious meningitis, encephalomyelitis, Parkinson's disease, Huntington's disease, Epilepsy, amyotrophic lateral sclerosis and viral or autoimmune encephalitis, preeclampsia; chronic liver failure, brain and spinal cord trauma, and cancer. The inflammatory disease can also be a systemic inflammation of the body, exemplified by gram-positive or gram negative shock, hemorrhagic or anaphylactic shock, or shock induced by cancer chemotherapy in response to proinflammatory cytokines, e.g., shock associated with proinflammatory cytokines Such shock can be induced, e.g., by a chemotherapeutic agent that is administered as a treatment for cancer. Other disorders include depression, obesity, allergic diseases, acute cardiovascular events, muscle wasting diseases, and cancer cachexia. Also inflammation that results from surgery and trauma can be treated with the concentrated therapeutic phospholipid compositions.

In some embodiments, the effective amount comprises from about 0.1 to about 5 grams of the washed phospholipid composition or blended lipid composition, preferably from about 0.2 to about 3 grams of the washed phospholipid composition or blended lipid composition, and most preferably about 0.5 to about 1.5 grams of the washed phospholipid composition or blended lipid composition.

The washed phospholipid extract compositions or blended lipid compositions (i.e., the lipid compositions) of the present invention may be used to treat a variety of subjects. Suitable subjects include humans as well as domestic animals, non-human primates, and companion animals such as dogs, cats and birds.

The lipid compositions of the present invention are preferably administered intravenously or orally. Accordingly, in some embodiments, the compositions of this invention (such as those described in the preceding sections) are contained in acceptable excipients and/or carriers for oral consumption or for intravenous administration. The actual form of the carrier, and thus, the composition itself, is not critical. The carrier may be a liquid, gel, gelcap, capsule, powder, solid tablet (coated or non-coated), tea, or the like. The composition is preferably in the form of a tablet or capsule and most preferably in the form of a soft gel capsule. Suitable excipient and/or carriers include vegetable oil, fish oil, krill oil, maltodextrin, calcium carbonate, dicalcium phosphate, tricalcium phosphate, microcrystalline cellulose, dextrose, rice flour, magnesium stearate, stearic acid, croscarmellose sodium, sodium starch glycolate, crospovidone, sucrose, vegetable gums, lactose, methylcellulose, povidone, carboxymethylcellulose, corn starch, and the like (including mixtures thereof). Preferred carriers include calcium carbonate, magnesium stearate, maltodextrin, and mixtures thereof. The various ingredients and the excipient and/or carrier are mixed and formed into the desired form using conventional techniques. The tablet or capsule of the present invention may be coated with an enteric coating that dissolves at a pH of about 6.0 to 7.0. A suitable enteric coating that dissolves in the small intestine but not in the stomach is cellulose acetate phthalate. Further details on techniques for formulation for and administration may be found in the latest edition of Remington's Pharmaceutical Sciences (Maack Publishing Co., Easton, Pa.). For intravenous or oral administration, the omega-3 compounds and compositions of the present invention may preferably be provided as emulsions.

In some embodiments, the lipid compositions are formulated for oral administration with flavoring agents or sweeteners. Examples of useful flavoring include, but are not limited to, pure anise extract, imitation banana extract, imitation cherry extract, chocolate extract, pure lemon extract, pure orange extract, pure peppermint extract, imitation pineapple extract, imitation rum extract, imitation strawberry extract, or pure vanilla extract; or volatile oils, such as balm oil, bay oil, bergamot oil, cedarwood oil, walnut oil, cherry oil, cinnamon oil, clove oil, or peppermint oil; peanut butter, chocolate flavoring, vanilla cookie crumb, butterscotch or toffee. In one embodiment, the dietary supplement contains cocoa or chocolate. Emulsifiers may be added for stability of the final product. Examples of suitable emulsifiers include, but are not limited to, lecithin (e.g., from egg or soy), and/or mono- and di-glycerides. Other emulsifiers are readily apparent to the skilled artisan and selection of suitable emulsifier(s) will depend, in part, upon the formulation and final product. In addition to the carbohydrates described above, the nutritional supplement can contain natural or artificial (preferably low calorie) sweeteners, e.g., saccharides, cyclamates, aspartamine, aspartame, acesulfame K, and/or sorbitol.

The lipid compositions of the present invention may also be delivered as dietary supplements, nutritional supplements, or functional foods.

The dietary supplement may comprise one or more inert ingredients, especially if it is desirable to limit the number of calories added to the diet by the dietary supplement. For example, the dietary supplement of the present invention may also contain optional ingredients including, for example, herbs, vitamins, minerals, enhancers, colorants, sweeteners, flavorants, inert ingredients, and the like. For example, the dietary supplement of the present invention may contain one or more of the following: asorbates (ascorbic acid, mineral ascorbate salts, rose hips, acerola, and the like), dehydroepiandosterone (DHEA), green tea (polyphenols), inositol, kelp, dulse, bioflavinoids, maltodextrin, nettles, niacin, niacinamide, rosemary, selenium, silica (silicon dioxide, silica gel, horsetail, shavegrass, and the like), spirulina, zinc, and the like. Such optional ingredients may be either naturally occurring or concentrated forms.

In some embodiments, the dietary supplements further comprise vitamins and minerals including, but not limited to, calcium phosphate or acetate, tribasic; potassium phosphate, dibasic; magnesium sulfate or oxide; salt (sodium chloride); potassium chloride or acetate; ascorbic acid; ferric orthophosphate; niacinamide; zinc sulfate or oxide; calcium pantothenate; copper gluconate; riboflavin; beta-carotene; pyridoxine hydrochloride; thiamin mononitrate; folic acid; biotin; chromium chloride or picolonate; potassium iodide; sodium selenate; sodium molybdate; phylloquinone; vitamin $D_3$; cyanocobalamin; sodium selenite; copper sulfate; vitamin A; vitamin C; inositol; potassium iodide. Suitable dosages for vitamins and minerals may be obtained, for example, by consulting the U.S. RDA guidelines.

In other embodiments, the present invention provides nutritional supplements (e.g., energy bars or meal replacement bars or beverages) comprising of the lipid compositions of the present invention. In preferred embodiments, the nutritional supplements comprise an effective amount of the components as described above. The nutritional supplement may serve as meal or snack replacement and generally provide nutrient calories. Preferably, the nutritional supplements provide carbohydrates, proteins, and fats in balanced amounts. The nutritional supplement can further comprise carbohydrate, simple, medium chain length, or polysaccharides, or a combination thereof. A simple sugar can be chosen for desirable organoleptic properties. Uncooked cornstarch is one example of a complex carbohydrate. If it is desired that it should maintain its high molecular weight structure, it should be included only in food formulations or portions thereof which are not cooked or heat processed since the heat will break down the complex carbohydrate into simple carbohydrates, wherein simple carbohydrates are mono- or disaccharides. The nutritional supplement contains, in one embodiment, combinations of sources of carbohydrate of three levels of chain length (simple, medium and complex; e.g., sucrose, maltodextrins, and uncooked cornstarch).

In still further embodiments, the present invention provides food products, prepared food products, or foodstuffs (i.e., functional foods) comprising the lipid compositions of the present invention. In preferred embodiments, the foods comprise an effective amount of the components as described above. For example, in some embodiments, beverages and solid or semi-solid foods comprising the fatty acids or derivatives thereof are provided. These forms can include, but are not limited to, beverages (e.g., soft drinks, milk and other dairy drinks, and diet drinks), baked goods, puddings, dairy products, confections, snack foods, or frozen confections or novelties (e.g., ice cream, milk shakes), prepared frozen meals, candy, snack products (e.g., chips), soups, spreads, sauces, salad dressings, prepared meat products, cheese, yogurt and any other fat or oil containing foods, and food ingredients (e.g., wheat flour).

In some preferred embodiments, the lipid compositions are incorporated into chewable matrices. Preferred chewable matrices jelly candies and gelatin-based gummi candy. Exemplary gummi candies include gummi bears, gummi worms, gummi frogs, gummi hamburgers, gummi cherries, gummi soda bottles, gummi sharks, gummi army men, gummi hippopotami, gummi lobsters, gummi watermelons, gummi octopuses, gummi apples, gummi peaches, and gummi oranges. The terms "gummi" and "gummy" are used interchangeably herein.

In some particularly preferred embodiments, the chewable matrix material is a sweetened material commonly referred to a gummy candy or jelly material. Gummy candy or jelly sweets are a broad general type of gelatin based, chewy candy. Gummy bears are the most popular and well known of the gummy candies. Other shapes are provided as well and gummy candies are sometimes combined with other forms of candy such as marshmallows and chocolates and as well made sour.

In preferred embodiments, the chewable matrix material comprises a gelling agent, which may be any physiologically tolerable gelling agent (preferably a saccharide (e.g. an oligosaccharide or polysaccharide), a protein or a glycoprotein) or combination capable of forming a soft, chewable, self-supporting chewable gel. Many such materials are known from the food and pharmaceutical industry and are discussed for example in Handbook of hydrocolloids, G O Phillips and P A Williams (Eds.), Woodhead Publishing, Cambridge, UK, 2000. The gelling agents are preferably materials capable of undergoing a sol-gel transformation, e.g. under the influence of a change in physiochemical parameters such as temperature, pH, presence of metal ions (e.g. group 1 or 2 metal ions), etc. Preferred gelling agents include gelatins, alginates and carageenans. However, the use of gelatins is especially preferred as breakdown in the throat of trapped fragments is ensured and as cores having the desired properties may readily be produced using gelatins.

The gelatins used as gelling agents in the chewable matrix of the invention may be produced from the collagen of any mammal or the collagen of any aquatic species, however the use of gelatin from salt-water fish and in particular cold and warm water fishes is preferred. Gelatins having an amino acid content of 5 to 25% wt. are preferred, more especially those having an amino acid content of 10 to 25% wt. The gelatins will typically have a weight average molecular weight in the range 10 to 250 kDa, preferably 75 to 220 kDa, especially 80 to 200 kDa. Gelatins having no Bloom value or low Bloom values of 60-300, 150-300 and especially 90-200 are preferred. Where a gelatin of no Bloom value, e.g. a cold water fish gelatin, is used, this will typically be used together with another gelatin or other gelling agent. The combination of cold water and warm water fish gelatins is especially preferred. The gelatin will typically be present in the aqueous phase at a concentration of 1 to 50% wt., preferably 2 to 35% wt., particularly 5 to 25% wt. In the case of mixtures of gelatin and polysaccharides, the weight ratio of gelatin to polysaccharide in the aqueous phase will typically be 50:1 to 5:1, preferably 40:1 to 9:1, especially 20:1 to 10:1.

Where polysaccharides, or mixtures of polysaccharides and gelatin are used as the gelling agent, it is preferred to use natural polysaccharides, synthetic polysaccharides or semi-synthetic polysaccharides, e.g. polysaccharides from plants, fish, terrestrial mammals, algae, bacteria and derivatives and fragmentation products thereof. Typical marine polysaccharides include carageenans, alginates, agars and chitosans.

Typical plant polysaccharides include pectins. Typical microorganism polysaccharides include gellans and scleroglucans. The use of charged, e.g. electrostatically charged and/or sulphated polysaccharides is preferred, as is the use of marine polysaccharides, in particular carageenans, and alginates, especially carageenans. The carageenan family, which includes iota- and kappa-carageenans, is a family of linear sulphated polysaccharides produced from red algae. The repeating disaccharide unit in kappa-carrageenan is β-D-galactose-4-sulphate and 3,6-anhydro-α-D-galactose, while that in iota-carrageenan is β-D-galactose-4-sulphate and 3,6-anhydro-α-D-galactose-2-sulphate. Both kappa- and iota-carageenans are used in food preparations. The carageenans are used as stabilisers, emulsifiers, gelling agents and fat replacers.

Both iota and kappa carageenans form salt- or cold-setting reversible gels in an aqueous environment. Coil-helix transition and aggregation of helices form the gel network. Kappa-carrageenan has binding sites for specific monovalent cations, resulting in gel formation with decreasing shear and elastic moduli in the order $Cs^+>K^+>>Na^+>Li^+$. As a rule, an increasing salt concentration enhances the elastic modulus and the setting and melting temperatures of a kappa-carrageenan gel. The use of water-soluble potassium, rubidium, or caesium compounds, particularly potassium compounds, and particularly naturally occurring compounds (e.g. salts) is preferred when kappa-carrageenan is used according to the invention, e.g. at concentrations of up to 100 mM, more especially up to 50 mM. A salt-dependent conformational transition is also found for iota-carrageenan. The molecules are also known to undergo coil-helix transition with strong helix-stabilisation in the presence of multivalent cations, like $Ca^{2+}$. The use of water-soluble calcium, strontium, barium, iron or aluminium compounds, especially calcium compounds, and particularly naturally occurring compounds (e.g. salts) is preferred when iota-carrageenan is used according to the invention, e.g. at concentrations of up to 100 mM.

The polysaccharide gelling agents used according to the invention will typically have weight average molecular weights of 5 kDa to 2 MDa, preferably 10 kDa to 1 MDa, most preferably 100 kDa to 900 kDa, particularly 200 to 800 kDa. They will typically be used at concentrations of 0.01 to 5% wt, preferably 0.1 to 1.5% wt., particularly 0.2 to 1% wt in the aqueous phase. Where mono or multivalent cations, typically group 1 or group 2 metal ions, are included in the aqueous phase, this will typically be at concentrations in the range 2.5 to 100 mM, particularly 5 to 50 mM.

Besides the gelling agent and water and any required gelling initiator, other physiologically tolerable materials may be present in the chewable matrix, e.g. emulsifiers, emulsion stabilizers, pH modifiers, viscosity modifiers, sweeteners, fillers, vitamins (e.g. vitamin C, thiamine, riboflavin, niacin, vitamin B6, vitamin B12, folacin, panthotenic acid), minerals, aromas, flavors, making agents, colors, physiologically active agents, etc., as described above in detail in relation to addition materials that can be included in the oxidizable fatty acid composition.

The chewable matrix preferably has a gelling temperature in the range 10 to 30 C, more preferably 15 to 28 C., and a melting temperature in the range 20 to 80 C, more preferably 24 to 60 C, especially 28 to 50 C.

Where a sweetener is included in the chewable matrix, this will typically be selected from natural sweeteners such as sucrose, fructose, glucose, reduced glucose, maltose, xylitol, maltitol, sorbitol, mannitol, lactitol, isomalt, erythritol, polyglycitol, polyglucitol, glycerol, stevia, agave nectar, inverti syrup and artificial sweeteners such as aspartame, acesulfame-K, neotame, saccharine, sucralose. The use of non-cariogenic sweeteners is preferred and the use of xylitol is especially preferred. Preferred flavorings include orange, raspberry, cherry, lemon, blood orange, grapefruit, strawberry, blueberry, blackberry and combinations thereof, especially orange and raspberry.

Mass production of gummi confection (e.g., gummi bears) includes mixing the gummi confection ingredients and pouring the resulting mixture into many starched-lined (e.g., corn starch-lined) trays/molds. The corn starch prevents the gummy bears from sticking to the mold and lets them release easily once they are set. First, the desired character molds are created and, if necessary, duplicated with a machine. Optionally, starch powder is applied to the character molds. Gummi confection ingredients, such as sugar, glucose syrup, gelatin, and water are mixed together and heated. In one aspect, the ingredients are mixed with colors and flavors that give the bears their signature look and taste. The molten gelatin mixture is poured into the molds and allowed to cool and set prior to packaging or consumption. Preferably, the gummi confection is subsequently heated and placed in a large drum tumbler to apply a composition of isolated *Bacillus coagulans* and a sweetener (e.g., a sugar).

In some preferred embodiments, production of gummi confection includes the following. A colloid batch and a puree batch are formed and combined with corn syrup and sugar to form a base slurry. The colloid batch comprises a solution of the gelling agent in water at a level of from 5 to 15% by weight of the gelling agent, more preferably from 7 to 12% of the gelling agent based on the total weight of the colloid batch. The colloid batch is held at a temperature of 170 to 190 F. The puree batch preferably comprises water, fruit puree and/or high fructose corn syrup or other sweeteners, thin boiling starch, and sodium citrate. It is held at a temperature of from 65 to 75 F. Preferably, the fruit puree has a Brix of from 10 to 45, more preferably from 25 to 40. Optionally, the puree batch includes a plurality of fruit purees. The fruit puree comprises a typical fruit puree, a fruit juice, or a fruit powder. The puree batch comprises from 30 to 40% by weight water, from 0 to 40% by weight fruit puree, from 0 to 40% by weight high fructose corn syrup, from 25 to 35% by weight thin boiling starch, and from 0.0 to 2.0% by weight sodium citrate. In a mixing kettle from 25 to 40% by weight of additional corn syrup is combined with from 15 to 40% by weight of fine granulated sugar, from 10 to 15% by weight of the colloid batch and from 20 to 30% by weight of the puree batch to form the base slurry. Preferably, the corn syrup is approximately 42 DE corn syrup, however, as would be understood by one of ordinary skill in the art other DE corn syrups could be used. The base slurry components are completely mixed and held at 130 to 150 F in a holding tank.

The base slurry is then cooked to bring the Brix to from 70 to 85 Brix, more preferably to a Brix of from 75 to 80. In one embodiment the base slurry is passed through a coil cooker and heated to a temperature of from 250 to 325 F to cook it. Other cooking methods could be used as will be understood by one of ordinary skill in the art. The cooked base slurry is preferably subjected to vacuum to further increase the Brix into the desired range. The cooked base slurry is held at approximately 200 F until used. An acidulant solution is preferably added along with color and flavor to the cooked base slurry just prior to deposition in the starch molds. In one aspect, the acidulant solution comprises ascorbic acid present in an amount of from 15 to 20% by weight, citric acid present in an amount of from 10 to 20% by weight, and malic acid present in an amount of from 5 to 10% by weight with the remainder comprising water. As would be understood by one of ordinary skill in the art, other edible acids could be used in place of or in addition to those listed. In one aspect, 95 to 97% by weight of cooked base slurry is combined with from 2 to 3% by weight of the acidulant solution and the remainder comprises flavors and colors. Optionally, the acidulant solution is used to bring the pH of the base slurry to from 2.6 to 3.2. One of ordinary skill in the art would have no difficulty selecting suitable colors and flavors. The combined mixture is then deposited into starch molds, e.g., using a Mogul starch molding machine. Such starch molding machines are well known by those of ordinary skill in the art. In one aspect, from 0.3 to 3 grams of the base slurry is deposited into each mold cavity. In some preferred embodiments, the starch molding machine ("Mogul") used to form the gummy bears comprises two nozzles for each mold, and a device for delivery of small softgel capsules. The first nozzle provides about 40% of the volume of the mold before one capsule is placed in the mold. Finally, the second nozzle fills up the mold. The gummy bear containing the capsule is then quickly cooled. The starch trays with deposited base slurry are transferred to a drying room where there are held for 12 to 48 hours. Optionally, the trays are first held at a temperature of from 130 to 150 F for from 10 to 15 hours, and then cooled to 70 to 80 F and held at that temperature for from 6 to 12 hours. The gelled starch molded food pieces are then removed from the trays, the starch is recycled.

In some embodiments of the invention, it is contemplated that oil inside the capsule is protected from hydrolysis by water present in the product. Gummy candies and other jelly sweets contain rather high amounts of water and further, the acidity is low to counteract growth of bacteria.

Example 1

This example describes the production of krill coagulum (paste).

Materials and Methods

Raw Material.

Frozen krill were obtained by Aker Biomarine and 10 tons were stored at Norway Pelagic, Bergen, and retrieved as required. The krill was packed in plastic bags in cardboard boxes with 2×12.5 kg krill. The boxes were stamped FRAL and C05S or A06S. The boxes with krill were placed in a single layer on the floor of the process plant the day before processing. By the time of processing the krill varied from +3° C. to −3° C.

Processing and Equipment.

Heating was performed in steam heated kettles (200 l) or in scraped surface heat exchangers (Contherm 6×4, Alfa Laval AB).

Krill and hot liquid (usually 95±2° C.) were mixed in a monopump with screw feeding (PCM 4L IVA, PCM S.A., Vanves, France). The pump was calibrated with water for the total flow, and when krill was added the water flow was reduced.

The mixture of krill and hot liquid was held at the designated temperature (70±5° C.) by transportation through an isolated stainless steel tube (6×2 "tubes á 6 m and 5×180° bend á 0.3 m, total length 37.5 m) or through a Archimedes type hose pump (Matcon, Herslev, tube 3"×26 m).

Krill and liquid was first separated on a metal sieve.

For most of the experiments krill and coagulum was drained on a single or twin belt filter (Sobye Miljøfilter A S, Skogsvåg, the air opening of the synthetic fiber filter was 0.8 mm). Membrane filtration of cooking liquid was performed in a (P19-40 100 nm ZrO2 membrane, Ceramic MF plant, Downstream Processing, Bergen) at 70° C. As pre filter before the membrane filtration a roto-fluid sieve (Jesma vs 20/65, Hans Jessens Maskinbyggeri A S, Vejle), (air opening 100 μm).

Drained coagulum was dewatered in a twin screw press (P9, Stord Bartz, Bergen, Volume ratio 1:4.2).

The cooked krill was dewatered in a twin screw press (P13, Stord Bartz, Bergen, Volume ratio 1:5).

The press liquid was separated either in a tricanter (Z23, Flottweg GmbH & Co., Vilsbiburg, Germany) or in a combination of a roto-fluid sieve (Jesma vs 20/65, Hans Jessens Maskinbyggeri A S, Vejle), (air opening 100 μm) and oil separator (SA-1, Westfalia Separator AG, Oelde, Germany).

Stick water was concentrated in a 4-stage falling film evaporator (Anhydro, Soborg, Denmark).

Drying was performed in a hot air drier with mechanical fluidization (FT200, Forberg, Larvik) or in a steam heated Rotadisc drier (TST 0,3R, Stord Bartz, Bergen).

Analytical Methods.

Protein, Kjeldahl's Method:

Nitrogen in the sample is transformed to ammonium by dissolution in concentrated sulfuric acid with cupper as catalyst. The ammonia is liberated in a basic distillation and determined by titration, (ISO 5983:1997(E), Method A 01). Uncertainty: 1%.

Protein, Combustion:

Liberation of nitrogen by burning the sample at high temperature in pure oxygen. Detection by thermal conductivity. Percent protein in the sample is calculated by a multiplication of analysed percent nitrogen and a given protein factor, (AOAC Official Method 990.03, 16th ed. 1996, Method A 25).

Moisture:

Determination of the loss in mass on drying at 103° C. during four hours (ISO 6496 (1999). Method A 04). Uncertainty: 4%.

Ash:

Combustion of organic matter at 550° C. The residue remaining after combustion is defined as the ash content of the sample. (ISO 5984:2002. Method A 02). Uncertainty: 3%.

Fat, Ethyl Acetate Extraction:

Absorption of moisture in wet sample by sodium sulphate, followed by extraction of fat by ethyl acetate (NS 9402, 1994 (modified calculation). Method A 29).

Fat, Soxhlet:

Extraction of fat by petroleum ether. Mainly the content of triglycerides is determined, (AOCS Official Method Ba 3-38 Reapproved 1993. Method A 03).

Fat, Bligh and Dyer:

Extraction of fat by a mixture of chloroform, methanol, and water in the proportion 1:2:0.8 which build a single phase system. Addition of chloroform and water gives a chloroform phase with the lipids and a water/methanol phase. The lipids are determined in an aliquot of the chloroform phase after evaporation and weighing. The extraction includes both triglycerides and phospholipids. (E. G. Bligh & W. J. Dyer: A rapid method of total lipid extraction and purification. Can. J. Biochem. Physiol. Vol 37 (1959). Metode A 56).

Astaxanthin:

Extraction with ethanol and di-chloromethane. Polar products are removed by open column chromatography on silica gel. Isomers are separated on normal phase HPLC on Si 60 column and detection at 470 nm. (Schierle J. & Hardi W. 1994. Determination of stabilized astaxanthin in Carophyll® Pink, premixes and fish feeds. Edition 3. Revised Supplement to: Hoffman P, Keller H E, Schierle J., Schuep W. Analytical methods for vitamins and carotenoids in feed. Basel: Department of Vitamin Research and Development, Roche. Method A 23)

Moisture in Oil:

Determination of actual water content of fats and oils by titration with Karl Fischer reagent, which reacts quantitatively with water, (AOCS Official Method CA 2e-84. Reapproved 1993. Method A 13).

Krill and preheated water were mixed in a cooker and brought to a temperature of 70 C. Next, the heated krill and the hot water were separated by filtration to provide a krill milk. The krill milk was then coagulated by heating to 95° C. and separated from the liquid by Soby Miljøfilter. Coagulum was then pressed in the P-9 press. Tables 1 and 2 gives analyses of coagulum on wet base and dry base. The dry matter of the coagulum was between 12.8 and 16.7%. On dry base the fat content about 60% and TMAO 340 mg N/100 g. The dry matter of the coagulum increased to 34-38% by pressing. The fat content also increased on dry base (Table 3), but the TMAO was reduced to 145 mg N/100 g. After washing the press cake with 1 part water to 1 part press cake of coagulum and then press again, the TMAO was reduced to 45 mg N/100 g on dry base (Table 4).

TABLE 1

Analysis of coagulum on wet base (wb)

| Sample:<br>Analysis:<br>Date: | Coagulum<br>Dry matter<br>g/100 g | Fat, B&D<br>g/100 g | Protein<br>g/100 g | Ash<br>g/100 g | TVN<br>mg N/100 g | TMA<br>mg N/100 g | TMAO<br>mg N/100 g |
|---|---|---|---|---|---|---|---|
| 10 Oct. 2007 | 12.8 | 7.9 | | | | | |
| 10 Oct. 2007 | 14.3 | 8.3 | 5.4 | 1.0 | 5.9 | 2.3 | 48.6 |
| 31 Oct. 2007 | 16.7 | 9.3 | 6.2 | | | | |
| Average | 14.6 | 8.5 | 5.8 | | | | |

TABLE 2

Analysis of coagulum on dry base (db)

| Sample:<br>Analysis:<br>Date: | Coagulum<br>Dry matter<br>g/100 g | Fat, B&D<br>g/100 g | Protein<br>g/100 g | Ash<br>g/100 g | TVN<br>mg N/100 g | TMA<br>mg N/100 g | TMAO<br>mg N/100 g |
|---|---|---|---|---|---|---|---|
| 10 Oct. 2007 | 100 | 61.7 | | | | | |
| 25 Oct. 2007 | 100 | 58.0 | 37.8 | 7.0 | 41.0 | 16.4 | 340.1 |
| 31 Oct. 2007 | 100 | 55.7 | 37.1 | | | | |
| Average | 100 | 58.5 | 37.4 | | | | |

TABLE 3

Analysis of press cake from coagulum on wet base

| Sample:<br>Analysis:<br>Date: | Press cake of coagulum<br>Dry matter<br>g/100 g | Fat, B&D<br>g/100 g | TVN<br>mg N/100 g | TMA<br>mg N/100 g | TMAO<br>mg N/100 g | Raw krill worked up<br>kg | Coagulum perss cake<br>kg | Coagulum PK per kg raw krill<br>kg/kg |
|---|---|---|---|---|---|---|---|---|
| 22 Nov. 2007 | 38.8 | 23.6 | 7.9 | 4.5 | 56.1 | 1000 | 54.2 | 0.0542 |
| 11 Dec. 2007 | 33.8 | 22.5 | 3.4 | 0 | 45.3 | 500 | 21.92 | 0.0438 |
| 11 Dec. 2007* | 33.6 | 21.3 | 0 | 0 | 15.3 | 500 | 15 | 0.0300 |

*After 1 wash (Press cake:water = 1:1)

TABLE 4

Analysis of press cake from coagulum on dry base

| Sample:<br>Analysis:<br>Date: | Press cake of coagulum<br>Dry matter<br>g/100 g | Fat. B&D<br>g/100 g | TVN<br>mg N/100 g | TMA<br>mg N/100 g | TMAO<br>mg N/100 g |
|---|---|---|---|---|---|
| 22 Nov. 2007 | 100 | 60.8 | 20.4 | 11.6 | 144.6 |
| 11 Dec. 2007 | 100 | 66.6 | 10.1 | 0.0 | 134.0 |
| 11 Dec. 2007* | 100 | 63.4 | 0.0 | 0.0 | 45.5 |

*After 1 wash (Press cake:water = 1:1)

Example 2

This example describes the washing procedure of an oil extract obtained from krill dried meal with ethanol extraction. After a first removal of most of the ethanol, the material comprised 60.5% dry matter and 2.4% water apart from ethanol. To 94.5 kg of this material, 24.8 kg of water and 35.0 kg of ethanol was added. The mixture was stirred and allowed to separate in a bottom layer comprising most of the phospholipids, a triacylglycerol rich layer in the middle, and a top layer containing less than about 3% lipids, mainly lysophospholipids. The conductivity of the bottom layer was 722 us/cm. The two top layers comprising 81.7 kg was removed and 67 kg of 60% ethanol in water (w/w) was added to the bottom layer and stirred vigorously for about 10 minutes. After settlement of the phases, a top layer of 82.2 kg was removed and 76.0 kg of a 60% ethanol solution was added to the bottom layer (conductivity now 384 uS/cm) and stirred vigorously for about 10 minutes. After settlement, the top phase comprising 82.0 kg was removed. The conductivity of the bottom phase was now 183 uS/cm. After evaporation of ethanol/water from the bottom phase, 31.0 kg of a lipid product was obtained that contained 16.4% EPA and 7.9% DHA (up from 12% EPA and 6% DHA) and 55.21% phospholipids (up from 40%). The product was further highly improved on smell and taste.

The composition of the polar lipid fraction was as follows:

| Phospholipid | Weight-% | Mol-% | MW [g/mol] |
|---|---|---|---|
| PC | 45.38 | 79.47 | 790.0 |
| 1-LPC | 0.45 | 1.17 | 534.5 |
| 2-LPC | 3.76 | 9.73 | 534.5 |
| PI | 0.24 | 0.37 | 907.0 |
| LPI | —*) | —*) | 629.5 |
| PS—Na | —*) | —*) | 833.0 |
| LPS | —*) | —*) | 555.5 |
| SPH | —*) | —*) | 812.0 |
| PE | 3.05 | 5.47 | 770.0 |
| LPE | 0.31 | 0.88 | 492.5 |
| APE | 1.44 | 1.93 | 1032.0 |
| PG | —*) | —*) | 820.0 |
| DPG | —*) | —*) | 774.0 |
| PA | —*) | —*) | 746.0 |
| LPA | —*) | —*) | 468.5 |
| Other | 0.58 | 0.98 | 812.0 |
| Sum | 55.21 | 100.00 | |
| Phosphorus | 2.24 | | |

Example 3

This example describes the extraction of oil from a wet material. A coagulum from krill comprising about 70% water, 15% lipids and about 15% other dry matter, mainly proteins, was obtained as described in WO 2009/027692, incorporated by reference herein in its entirety. This material was subjected to an extraction procedure as follows. 3500 grams of pure ethanol was added to 1004 grams of the coagulum and stirred for 45 minutes. The mixture was then filtered through a filter paper applying vacuum on the receiving flask to obtain 3854 gram of filtrate. 1179 gram of the filtrate was subjected to evaporation on a rotary evaporator and the obtained dry matter was washed 4 times with a 60% solution of ethanol and finally the solvent was evaporated in a rotary evaporator. The obtained oil, 23.7 gram, was solid at room temperature and comprised 76.8% phospholipids. Water is removed by freeze drying.

The content of EPA was 200 mg/gram and the content of DHA 87 mg/gram oil. The composition of the phospholipid fraction was as follows:

| Phospholipid | Weight-% | Mol-% | MW [g/mol] |
|---|---|---|---|
| PC | 71.97 | 93.03 | 790.0 |
| 1-LPC | 0.24 | 0.45 | 534.5 |
| 2-LPC | 0.73 | 1.39 | 534.5 |
| PI | —*) | —*) | 907.0 |
| LPI | —*) | —*) | 629.5 |
| PS—Na | —*) | —*) | 833.0 |
| LPS | —*) | —*) | 555.5 |
| SPH | —*) | —*) | 812.0 |
| PE | 3.37 | 4.47 | 770.0 |
| LPE | —*) | —*) | 492.5 |
| APE | —*) | —*) | 1032.0 |
| PG | —*) | —*) | 820.0 |
| DPG | —*) | —*) | 774.0 |
| PA | —*) | —*) | 746.0 |
| LPA | —*) | —*) | 468.5 |
| Other | 0.53 | 0.66 | 812.0 |
| Sum | 76.83 | 100.0 | |
| Phosphorus | 3.03 | | |

Example 4

This example describes an alternative method for extraction of oil from the krill wet material, starting from a frozen paste from krill, which was subjected to an extraction procedure as described below. Unlike example 3, all steps were performed under a nitrogen atmosphere.

The paste comprises about 65% water (assessed via dry matter), 17% lipids (about equal weights of phospholipids and neutral lipids), and about 18% other dry matter, mainly proteins. Within the lipids, the proportions of certain fatty acids by weight were as follows: C16:0 about 15-17%; C14:0 about 6-10%; C18:3 n-3 about 1.4-3.1%; and C18:4 n-3 about 3.5-7%.

100 kg of the frozen coagulum (−20° C.) was added to a vessel. Based on the water content of the coagulum, 350 kg of pure ethanol (99.8% w/w, room temp) was then added to the vessel, giving a final ethanol concentration in the liquid phase of about 84% w/w (~350 kg ethanol in 415 kg liquid solvents). Ethanol was added to give near to the desired final concentration, and then water content was checked by Karl Fischer titration and extra ethanol was added to give the correct final amount.

The mixture was stirred in the vessel for 45 minutes, with gentle heating if required. Four final temperatures were studied in separate batches, namely a) 2° C., b) 10° C., c) 15° C. and d) 20° C. After stirring was complete, the mixtures were allowed to settle, and they each included a red-coloured liquid phase and a wet slurry which contained shell fragments and other insoluble materials. To remove the liquid phase from the slurry the mixtures were decanted, and the liquid material was put through a coarse filter and then serial-filtered through a 75 μm and 5 μm cartridge filter to obtain a) 345 kg, b) 366 kg, c) 372 kg or d) 374 kg of filtrate, with residual material remaining in the filtration cake. Smaller cartridge filters (e.g. 1.2 μm) have also been used.

The filtrates were then subjected to a sequence of washes. Firstly, de-ionized water was added to give ~60% w/w ethanol solutions (a: 137 kg water; b: 149 kg; c: 152 kg; d: 155 kg) and the mixtures were stirred for 10-15 minutes and left to settle for 12-24 h at room temperature (15-20° C.) in vessels having a valve at the base. The bottom phase was isolated by draining the bottom phase through the valve, to give between 5.4-9.0 kg of a lipid-rich fraction. The lipid-rich fraction was re-washed 2 to 5 times with 60% w/w ethanol at room temperature to give a final material which contained about 80% by weight phospholipids and 20% neutral lipids. In even the first wash, 85% of TMAO was removed, and the further washes led to material with undetectable TMAO (less than 1 mgN/100 g i.e. at least 20-fold lower than reported in Table X of WO2013/102792).

This lipid-rich material was treated at least once by cold acetone precipitation. Three parts w/w acetone were added and the lipid rich material was dissolved by gentle heating and slow stirring. The stirring was stopped and the mixture was cooled to 4° C. for precipitation. When the precipitation was complete, the upper solvent phase was removed. This cold precipitation procedure was performed three times in total, after first re-dissolving in fresh acetone each time.

The precipitate was then subjected to evaporation and freeze-drying to remove residual acetone and water. Batch c (i.e. extracted at 15° C., then washed 3×60% EtOH before cold acetone precipitation) provided 1.9 kg of solid material (an orange wax) consisting of 98% phospholipids/1.7% neutral lipids with a water content of 3%. The content of EPA was 19.2 g/100 g and the content of DHA was 11.0 g/100 g solid material. The composition of the phospholipid fraction measured by $^{31}$P NMR was as follows:

| Phospholipid | Weight-% | Mol-% | MW [g/mol] |
|---|---|---|---|
| PC | 82.59 | 89.03 | 790.0 |
| 1-LPC | —*) | —*) | 534.5 |
| 2-LPC | 0.12 | 0.19 | 534.5 |
| PI | 0.47 | 0.44 | 907.0 |
| LPI | —*) | —*) | 629.5 |
| PS—Na | —*) | —*) | 833.0 |
| LPS | —*) | —*) | 555.5 |
| SPH | —*) | —*) | 812.0 |
| PE | 8.25 | 9.13 | 770.0 |
| LPE | —*) | —*) | 492.5 |
| APE | 0.59 | 0.49 | 1032.0 |
| PG | —*) | —*) | 820.0 |
| DPG | —*) | —*) | 774.0 |
| PA | —*) | —*) | 746.0 |
| LPA | —*) | —*) | 468.5 |
| Other | 0.69 | 0.73 | 812.0 |
| Sum | 92.72 | 100.00 | |
| Phosphorus | 3.64 | | |

*)= not observed, no signal assignment

| Parameter | Results |
|---|---|
| Lipid composition[1] | |
| Triacylglycerol | <0.5 |
| Diacylglycerol | <0.5 |
| Monoacylglycerol | <1 |
| Free fatty acids | <0.5 |
| Cholesterol | <0.5 |
| Cholesterol ester | <0.5 |
| Phosphatidylethanolamine | 7.7 |
| Phosphatidylinositol | <1 |
| Phosphatidylserine | <1 |
| Phosphatidylcholine | 92 |
| Lyso-phosphatidylcholine | <0.5 |
| Total polar lipids | 99.4 |
| Total neutral lipids | <0.5 |
| Total sum lipids | 99.6 |
| Fatty acid composition[2] | |
| Sum saturated fatty acids | 17.8 |
| Sum monoenic fatty acids | 9.1 |
| Sum PUFA (n-6) fatty acids | 1.2 |
| Sum PUFA (n-3) fatty acids | 34.4 |
| Sum total PUFA fatty acids | 35.8 |
| Sum fatty acids total | 62.7 |
| Cholesterol | 0.31 weight % |
| Astaxanthin/esters | <2 mg/kg |
| Water content | 3% |

[1] Calculated based on techniques in Winther et al. (2011) Lipids 46: 25-36; Homan R et al 1998 J Chromatogr B Biomed Sci Appl 708: 21-26; and Moreau et al 2006 Lipids 41: 727-734.

[2] Calculated as fatty acid methyl esters, by AOCS Ce 1b-89.

Looking at specific fatty acids, proportions were as follows, measured across several batches:

| | C14:0 | C16:0 | 16/14 Ratio | C18:3 n-3 | C18:4 n-3 | 18:4/18:3 Ratio |
|---|---|---|---|---|---|---|
| Wet paste | 6-10% | 15-17% | 2-2.5 | 1.4-3.1% | 3.5-7% | 2-3 |
| Final material | 1.0-1.5% | 15-17% | 12-16 | 1.0-2.5% | 1.0-2.5% | 1-1.5 |

Thus, based on total weight of the material analysed by NMR, nearly 93% of the final material was phospholipid. After compensating for residual water (about 3%), residual organic solvent, and salts/minerals present after ignition, the overall purity was 98%. Thus this process provides phospholipids with higher purity than seen using Example 1.

Further analysis of lipid composition was performed by HPLC, and results are shown below (grams per 100 g of oil):

The purified phospholipids included both ether-linked and ester-linked fatty acids, but 10% or fewer were ether-linked. NMR showed ether-linked fatty acid moieties at position sn1 but not at sn2, and ether-linked fatty acids were either fully saturated or were monounsaturated. Where a phospholipid was a phosphatidylcholine, about 10% of the molecules included ether-linked fatty acids; where a phospholipid was a phosphatidylethanolamine (with or without N-acetylation), about 40% of the molecules included ether-linked fatty acids. PUFAs were seen only with ester linkages.

30-40% by weight of fatty acids in the purified phospholipids were omega-3, and these were distributed at the sn1 and sn2 positions (mainly at sn2). Most of the omega-3 fatty acids were EPA and/or DHA, with about 2× more EPA than DHA.

The phosphatidylethanolamine content using this process was higher than seen when using the method of Example 1 (about 2× higher).

The lysophosphatidylcholine content (0.2-0.4 mol %) is very low in the purified phospholipids, when compared both to the amount observed using the method of Example 1 (about 1%) and in the starting wet material (about 1.2-1.4 mol %). No molecules were detected where fatty acid chains had been lost at both the sn1 and sn2 positions. Lyso-phosphatidylethanolamine (with or without N-acetylation) and lyso-phosphatidylinositol also were not seen.

Levels of astaxanthins were much lower in the purified phospholipids when compared to the material obtained in Example 3. This reduction was even visible due to the weaker red colour. Amino acids, TMAO and homarine were all below LOQ by standard analytical methods.

Thus very pure krill phospholipids can be achieved by a process using extraction in 84% ethanol, followed by washing in 60% ethanol, and then multiple steps of cold-acetone precipitation.

Example 5

This example describes a process for making gummi candies containing a krill oil extract, preferably using a 60% w/w krill phospholipid composition prepared from the a washed polar lipid-rich extract. Gelatin is dissolved in water (1:2) and proteins deformed into gel at 80-100° C. (gelatin melts at 68° C.). At the same time, in another drum, sugar and syrups are mixed and cooked at 100-120° C. The gelatin and sugars are mixed in another drum by cooking and stirring at approx. After 2 hours, the end product usually contains 15-17% water. The gelatin and sugar mix is automatically cooled to 70-80° C. out of the vacuum drum. Different flavors (e.g., a combination of raspberry and orange) are added to the gummi mix. Acidification or alkaline treatment at pI for the gelatin (pigs gelatin, 250 bloom has a pI at pH 3-4) in then conducted. The krill phospholipid extract oil is then added to the gelatin and sugar mix. This process takes about 5-10 minutes. The krill extract is preferably diluted with water or sorbitol syrup prior to addition (e.g., the extract is liquid at 1:4 proportions oil:water). A homogenous mix of gummi material is poured into molds. Molds can be of corn or wheat quality and are reused. After 1-3 days at RT the GBs are formed and removed from the molds. The gummi candies are transferred into a chamber where they are sprayed with wax and oil. It is possible to perform a second coating with sugar.

All publications and patents mentioned in the above specification are herein incorporated by reference. Various modifications and variations of the described compounds, compositions, methods and uses of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the medical, biological and chemical sciences are intended to be within the scope of the following claims.

The invention claimed is:

1. An oral delivery capsule containing from 0.2 to 3.0 grams of a polar lipid-rich fraction extracted from *Euphausia superba* krill, said fraction comprising a mixture of phospholipid compounds having the following structure:

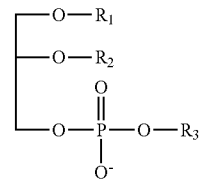

wherein $R_1$ and $R_2$ are selected from the group consisting of a fatty acid moiety and —H and $R_3$ is —H or a choline, ethanolamine, inositol or serine moiety, wherein said mixture of phospholipid compounds comprising more than about 85% (mol %) choline moieties at position $R_3$ and from about 20% to 40% w/w omega-3 fatty acid moieties, wherein said fraction comprises at least 50% phospholipids, and wherein said fraction is further characterized in having a conductivity of less than about 300 pS/cm measured in a saturated 60% ethanol solution.

2. The oral delivery capsule of claim 1, wherein said omega-3 fatty acid moieties in said fraction are selected from the group consisting of eicosapentaenoic acid, docosahexaenoic acid, and combinations thereof.

3. The oral delivery capsule of claim 1, wherein said fraction in said oral delivery capsule comprises at least 75% w/w of said phospholipid compounds.

4. The oral delivery capsule of claim 1, wherein said fraction in said oral delivery capsule comprises at least 90% w/w of said phospholipid compounds.

5. The oral delivery capsule of claim 1, wherein said omega-3 moieties in said mixture of mixture of phospholipid compounds in said fraction are eicosapentaenoic acid and said docosahexaenoic acid and wherein said eicosapentaenoic acid and said docosahexaenoic acid are present in a ratio of eicosapentaenoic acid:docosahexaenoic acid of from about 1:1 to about 3:1.

6. The oral delivery capsule of claim 1, wherein said fraction in said oral delivery capsule further comprises at least 5% ethyl esters comprising omega-3 fatty acid moieties.

7. The oral delivery capsule of claim 1, wherein said fraction in said oral delivery capsule comprises at least 10% glyceride compounds comprising said omega-3 fatty acid moieties.

8. The oral delivery capsule of claim 1, wherein said fraction in said oral delivery capsule comprises astaxanthin.

9. The oral delivery capsule of claim 1, wherein said fraction in said oral delivery capsule has a astaxanthin monoester:astaxanthin diester ratio of greater than about 4:1.

10. The oral delivery capsule of claim 1, wherein said fraction in said oral delivery capsule comprises less than about 0.05% w/w fatty acid esters.

11. The oral delivery capsule of claim 1, wherein said fraction in said oral delivery capsule comprises less than 5% w/w lysophospholipids.

12. A process for producing the oral delivery capsule of claim 1 comprising a polar lipid-rich extract from *Euphausia superba* krill oil comprising the steps of:

(a) contacting krill material with an alcohol under conditions such that polar lipids are preferentially extracted to form a slurry comprising a polar lipid solution and biological residue material;
(b) separating said polar lipid solution from said biological residue material to provide a separated polar lipid solution;
(c) adding water to said polar lipid solution to dilute said alcohol to about 50 to 70% w/w, so that said polar lipid solution separates into an upper phase comprising diluted alcohol and a lower polar lipid-rich bottom phase; and
(d) isolating said polar lipid-rich bottom phase to provide said polar lipid-rich fraction,
(e) washing said polar-lipid rich fraction with diluted alcohol in which polar lipids are poorly soluble to provide and upper phase comprising said protic solvent and a polar lipid-rich bottom phase and isolating said bottom phase to provide a washed polar lipid-rich fraction, and
(f) encapsulating 0.2 to 3.0 grams of said washed polar lipid-rich fraction to produce the oral delivery capsule.

13. The process of claim 12, wherein the concentration of said alcohol is diluted to about 60% w/w when combined with the moisture in said krill material.

14. The process of claim 12, wherein said contacting said krill material with a concentrated alcohol under conditions such that polar lipids are preferentially extracted comprises mixing said krill material with a concentrated alcohol at a temperature of from about −10 C to about 50 C so that the alcohol concentration when combined with moisture in said krill material is from about 70% to about 95% w/w.

15. The process of claim 12, wherein washing is repeated from 2 to about 5 times.

16. The process claim 12, wherein said washing said polar lipid-rich fraction with a diluted alcohol under conditions such that phospholipids are poorly soluble further comprises mixing said polar lipid-rich fraction with said diluted alcohol in a polar lipid-rich fraction to diluted alcohol ratio of from about 0.5:1 to 5:1, wherein said diluted alcohol comprises an aqueous solution of about 30% to 70% of said alcohol.

17. The process of claim 12, wherein said alcohol is selected from the group consisting of concentrated n-butanol, n-propanol, isopropanol, ethanol, and methanol.

18. The process claim 12, wherein said alcohol is ethanol.

19. The process of claim 12, wherein said washed polar lipid-rich extract is characterized in comprising less than about 3% lysophospholipids.

20. The process of claim 12, wherein said washed polar lipid-rich extract is characterized in comprising less than about 1% lysophospholipids.

21. The process of claim 12, wherein said washed polar lipid-rich extract is characterized in comprising less than about 0.5% lysophospholipids.

22. The process of claim 12, wherein said washed polar lipid-rich extract is characterized in comprising less than about 0.1% lysophospholipids.

23. The process of claim 12, wherein said washed polar lipid-rich extract is characterized in having a conductivity of less than 300 uS/cm measured in a saturated 60% ethanol solution.

24. The process of claim 12, further comprising precipitating phospholipids from said washed polar-lipid rich extract.

25. The process of claim 24, wherein said precipitating phospholipids from said washed polar-lipid rich extract further comprise mixing said washed polar-lipid rich extract with cold acetone under conditions such that phospholipids precipitate to provide a polar lipid-rich precipitate.

26. The process of claim 12, further comprising removing residual solvent from said polar lipid-rich extract or said washed polar lipid-rich extract by evaporation to provide a solid polar lipid-rich composition.

27. The process of claim 26, wherein said solid polar lipid-rich composition comprises at least 90% phospholipids w/w.

28. The process of claim 26, wherein said solid polar lipid-rich composition comprises less than about 3% lysophospholipids w/w.

29. The process of claim 26, wherein said solid polar lipid-rich composition comprises less than about 1% lysophospholipids w/w.

30. The process of claim 12, wherein said washed polar lipid-rich extract comprises less than about 0.05% w/w fatty acid esters.

31. The process of claim 12, wherein said washed polar lipid-rich extract has a astaxanthin monoester:astaxanthin diester ratio of greater than about 4:1.

32. The process of claim 12, wherein said krill material is selected from the group consisting of fresh krill, frozen krill, krill meal, wet krill paste, dried krill paste, and krill oil.

* * * * *